US010995463B2

(12) United States Patent
Winkes

(10) Patent No.: US 10,995,463 B2
(45) Date of Patent: May 4, 2021

(54) ASSEMBLY COMPRISING A FIRST AND A SECOND SECTION AND A FIXATION

(71) Applicant: SIEMENS GAMESA RENEWABLE ENERGY B.V., The Hague (NL)

(72) Inventor: Jasper Winkes, The Hague (NL)

(73) Assignee: SIEMENS GAMESA RENEWABLE ENERGY B.V., The Hague (NL)

(*) Notice: Subject to any disclaimer, the term of this patent is extended or adjusted under 35 U.S.C. 154(b) by 170 days.

(21) Appl. No.: 16/481,191

(22) PCT Filed: Jan. 29, 2018

(86) PCT No.: PCT/NL2018/050059
§ 371 (c)(1),
(2) Date: Jul. 26, 2019

(87) PCT Pub. No.: WO2018/139929
PCT Pub. Date: Aug. 2, 2018

(65) Prior Publication Data
US 2019/0390429 A1 Dec. 26, 2019

(30) Foreign Application Priority Data

Jan. 27, 2017 (NL) .................................. 2018250
Nov. 7, 2017 (NL) .................................. 2019865

(51) Int. Cl.
E02B 17/00 (2006.01)
F03D 13/25 (2016.01)
(Continued)

(52) U.S. Cl.
CPC ........... E02B 17/02 (2013.01); E04H 12/085 (2013.01); F03D 13/25 (2016.05);
(Continued)

(58) Field of Classification Search
CPC ..... E02B 2017/0091; E02B 2017/0065; E02B 17/02; F03D 13/10; F03D 13/20; F03D 13/25
See application file for complete search history.

(56) References Cited

U.S. PATENT DOCUMENTS 3,865,498 A 2/1975 Okuto et al.
5,076,594 A 12/1991 Baugh
(Continued)

FOREIGN PATENT DOCUMENTS

CN 1059949 A 4/1992
CN 1284147 A 2/2001
(Continued)

OTHER PUBLICATIONS

International Search Report and Written Opinion for the International Patent Application No. PCT/NL2018/050059, dated Jun. 19, 2018, 17 pages.
(Continued)

Primary Examiner — Frederick L Lagman
(74) Attorney, Agent, or Firm — Kacvinsky Daisak Bluni PLLC

(57) ABSTRACT

An assembly includes a first and a second section, where each section includes a longitudinal axis, and a fixation configured to fix the first and the second sections. At least one of the first and the second sections includes a body that is configured to be engaged by the fixation. The fixation includes an abutment and a displaceable actuator, and the actuator is radially displaceable.

19 Claims, 21 Drawing Sheets

(51) Int. Cl.
*E02B 17/02* (2006.01)
*E04H 12/08* (2006.01)

(52) U.S. Cl.
CPC ............ *E02B 2017/0065* (2013.01); *E02B 2017/0091* (2013.01); *F05B 2230/608* (2013.01); *F05B 2240/912* (2013.01)

(56) References Cited

U.S. PATENT DOCUMENTS

| | | | | |
|---|---|---|---|---|
| 2006/0277843 | A1* | 12/2006 | Livingston | E04H 12/10 52/110 |
| 2007/0245680 | A1* | 10/2007 | Cairo | F03D 13/20 52/848 |
| 2007/0267197 | A1 | 11/2007 | Pallini et al. | |
| 2012/0096700 | A1* | 4/2012 | Patterson | F16L 21/08 29/428 |
| 2012/0137622 | A1* | 6/2012 | Patterson | E02B 17/027 52/651.01 |
| 2013/0091784 | A1* | 4/2013 | Schmidt | F03D 13/20 52/115 |
| 2013/0224020 | A1* | 8/2013 | Dagher | F03D 13/25 416/84 |
| 2015/0204312 | A1* | 7/2015 | Patterson | F16L 23/036 285/412 |
| 2017/0152672 | A1* | 6/2017 | Santucci | E04H 12/182 |

FOREIGN PATENT DOCUMENTS

| | | |
|---|---|---|
| CN | 1659348 A | 8/2005 |
| CN | 101126285 A | 2/2008 |
| EP | 2077363 A2 | 7/2009 |
| EP | 2441955 A1 | 4/2012 |
| EP | 3064309 A1 | 9/2016 |
| GB | 2468926 A | 9/2010 |

OTHER PUBLICATIONS

Written Opinion of the International Preliminary Examining Authority for the International Patent Application No. PCT/NL2018/050059, dated Jan. 15, 2019, 7 pages.

International Preliminary Report on Patentability for the International Patent Application No. PCT/NL2018/050059, dated Apr. 10, 2019, 6 pages.

* cited by examiner

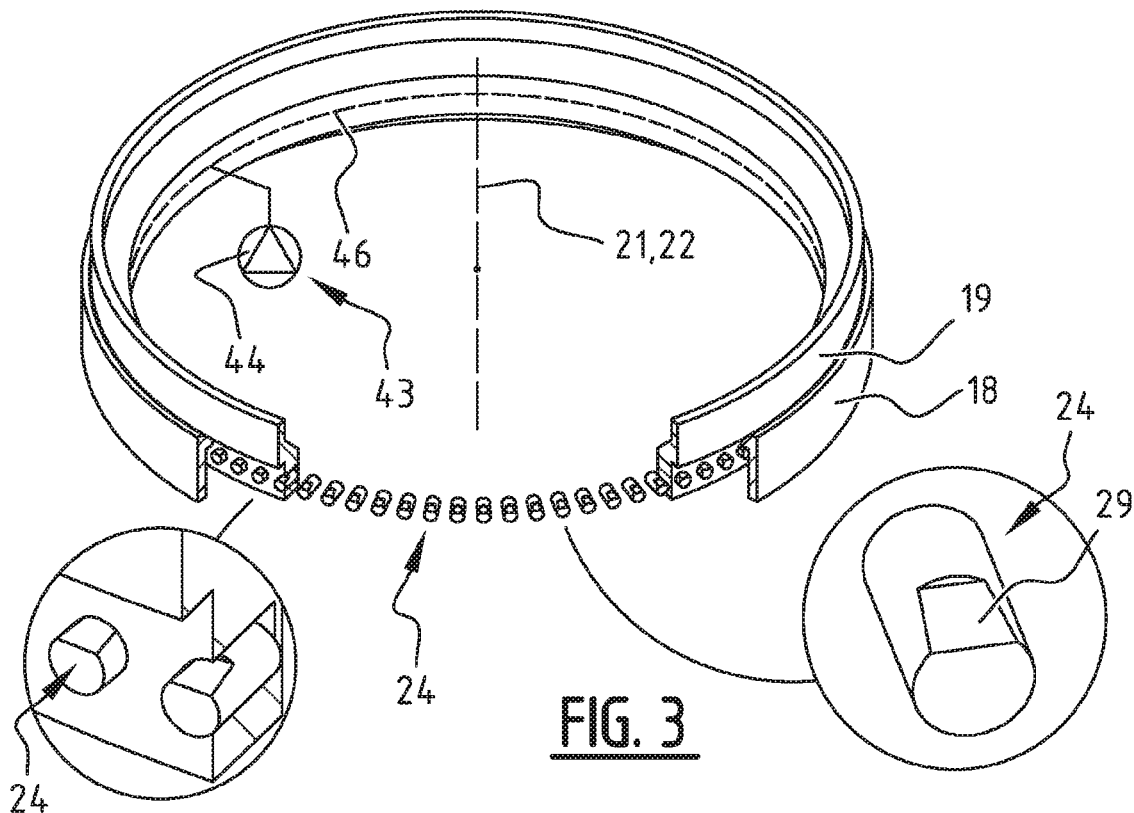
FIG. 3
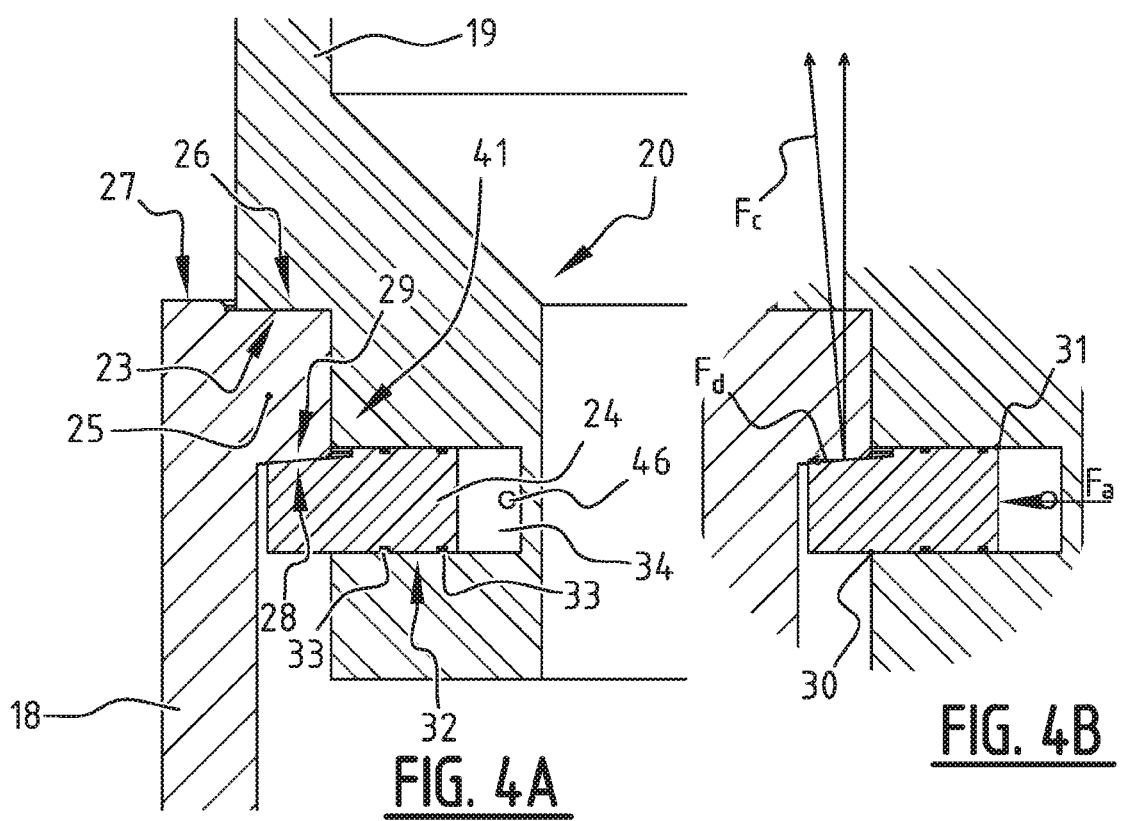
FIG. 4A
FIG. 4B

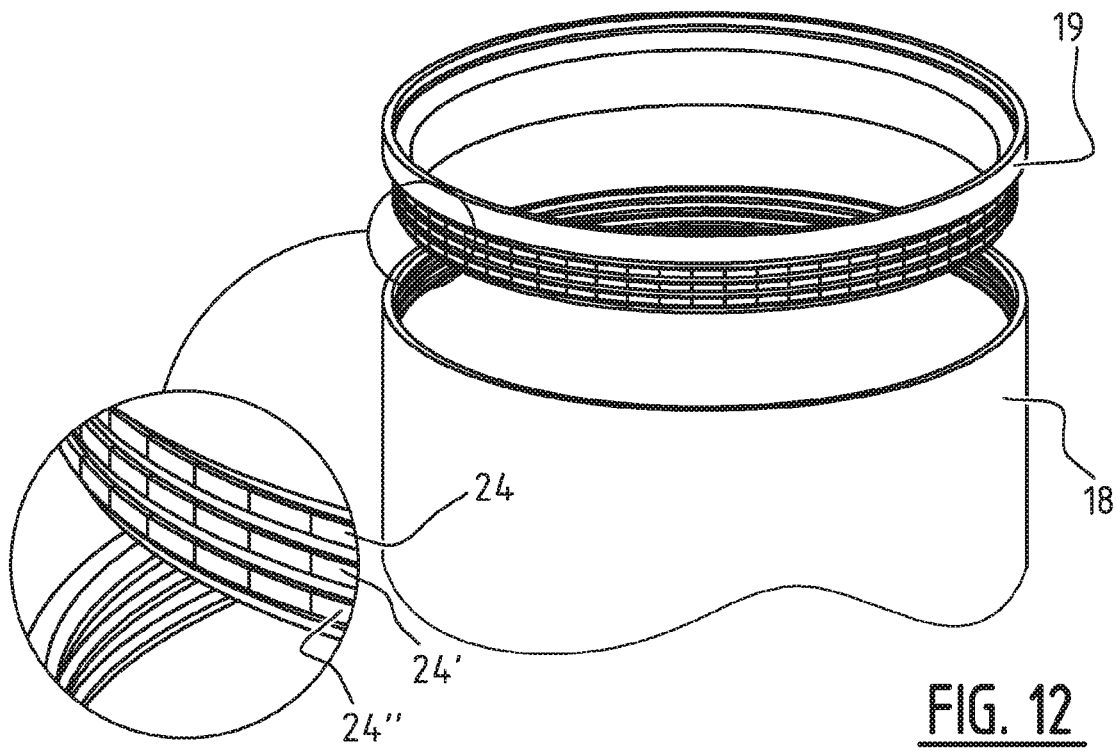
FIG. 12
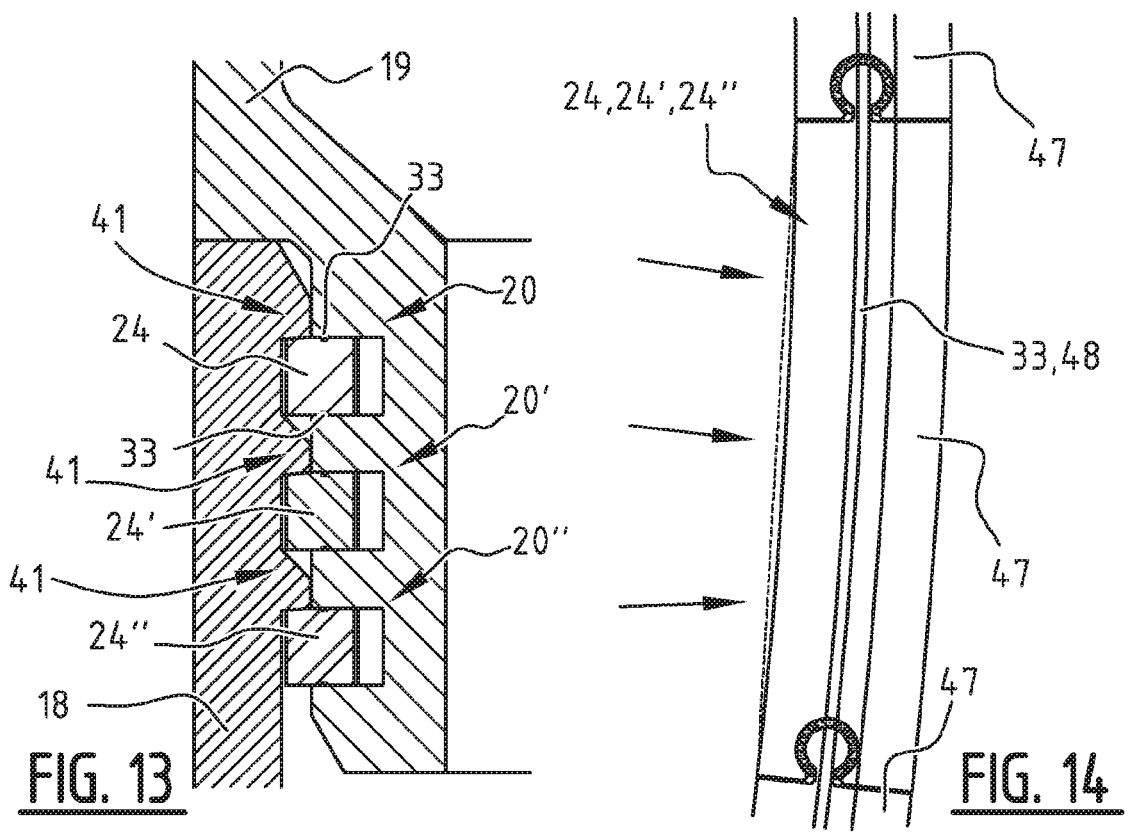
FIG. 13
FIG. 14

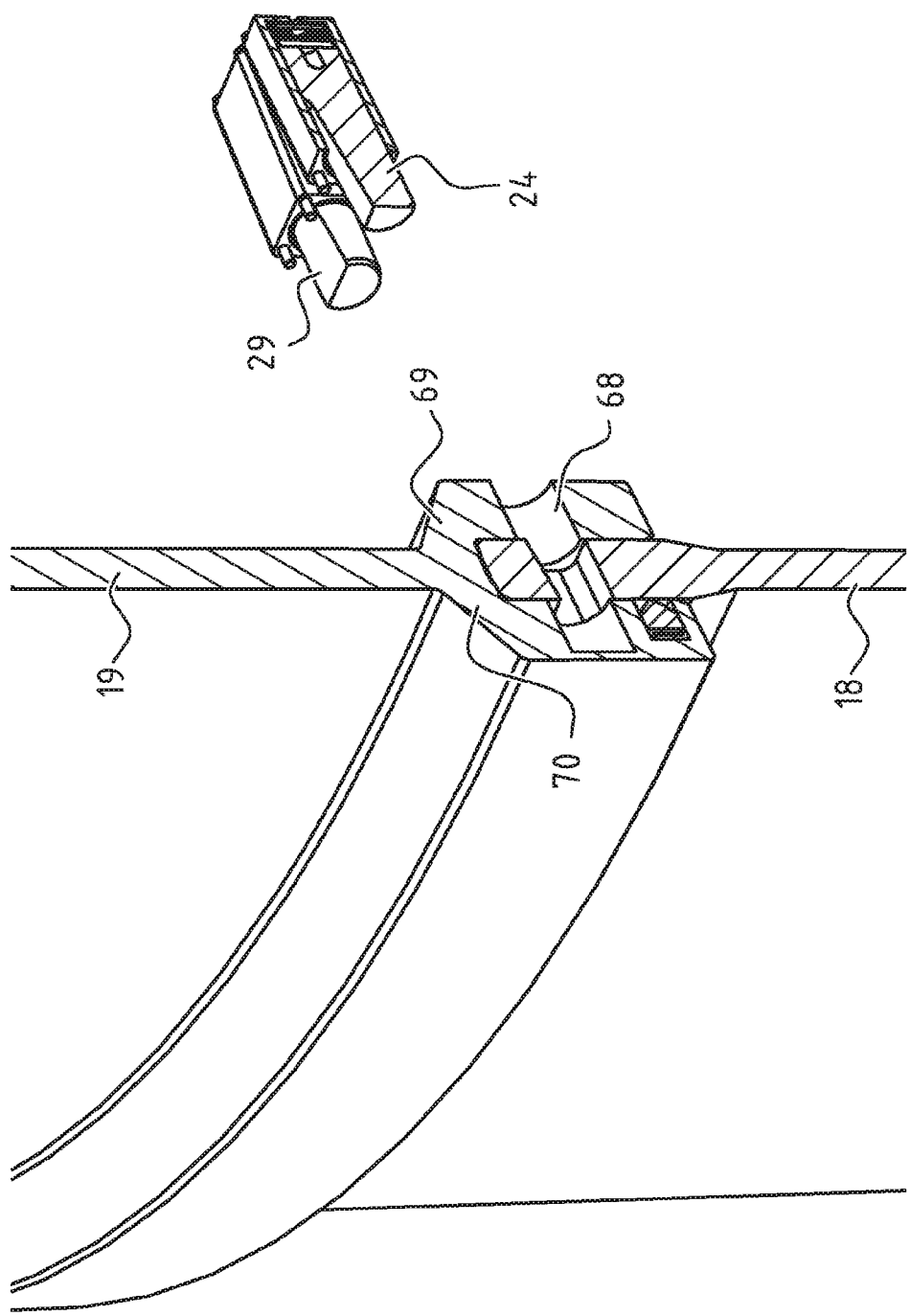

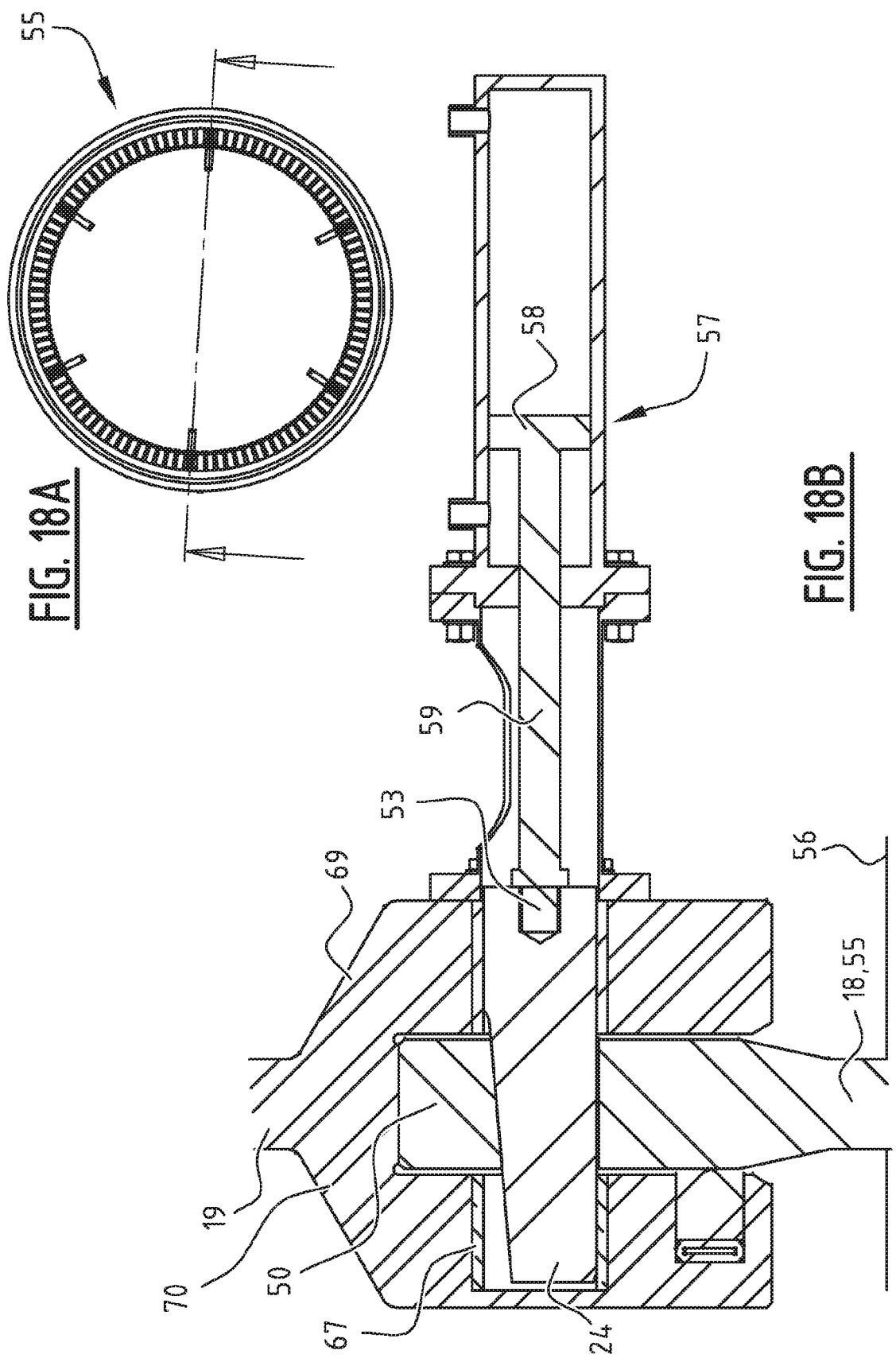

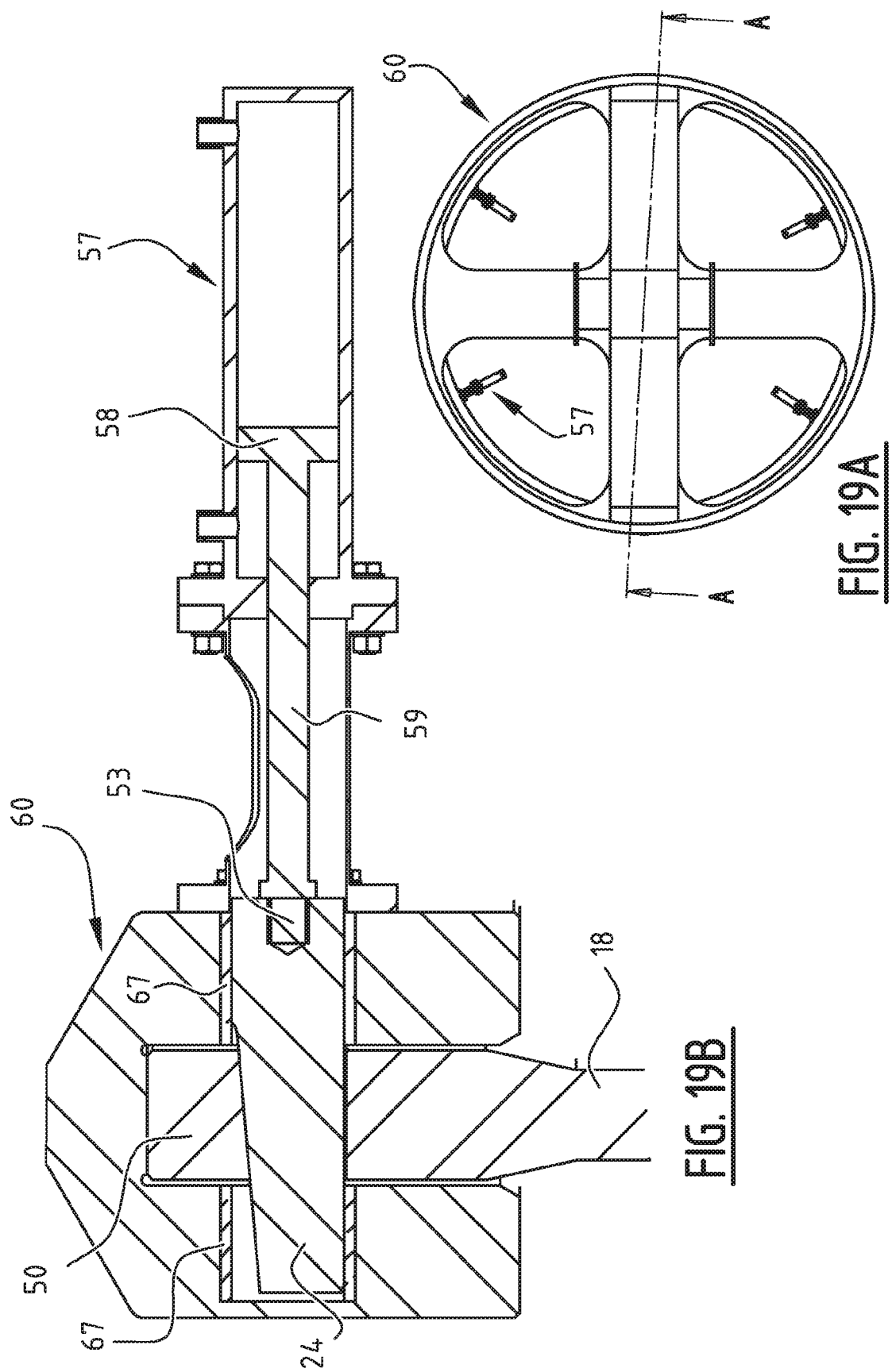

ASSEMBLY COMPRISING A FIRST AND A SECOND SECTION AND A FIXATION

This is a national stage application filed under 35 U.S.C. § 371 of pending international application PCT/NL2018/050059 filed Jan. 29, 2018, which claims priority to Netherlands Patent application NL 2018250, filed Jan. 27, 2017, and also claims priority to Netherlands Patent application NL 2019865, filed Nov. 7, 2017, the entirety of which applications are hereby incorporated by reference herein.

The present invention relates to an assembly, comprising a first and a second section, and a fixation configured to fix the first and the second section.

The present invention is particularly suitable for offshore applications, e.g. for connecting a wind turbine to a monopile, a wind turbine to a transition piece, a transition piece a monopile, as well as between sections of a monopile or wind turbine, and jacket connections.

According to prior art applications in offshore, the sections of such assemblies are provided with flanges which are connected using bolts of significant size. Currently M72 bolts are used for connecting a wind turbine tower to a monopile or transition piece. In a first step, these bolts are electrically tightened with 8,000 Nm. In a second step, the preload is increased with hydraulic tools to 22,000 Nm. The bolts itself are heavy and the tools for tightening the bolts is also heavy and hard to handle.

It appears that the actual preload on the bolts after some settling time is hard to predict and control, and may vary significantly. Although it is not exactly clear which factors influence the torque-tension relationship of the bolts, it may be concluded that installing the bolts using a "constant torque" method does not achieve satisfying results. The preload on the bolts must be regularly checked and adjusted, periodically requiring significant maintenance work.

Furthermore, the bolts are arranged all around the circumference of the flanges, leaving only a very limited gap between adjacent bolts. A connection using flanges with bolts is insufficiently scalable to meet the ever increasing demands resulting from even larger wind turbines and greater depths as sea where they are installed.

A tower connector having a connector assembly for joining a tower to a base structure, wherein the axial alignment of the tower to the base structure is adjustable, is known from EP-A1-2 441 955. In order to permit tilt adjustment, the connection is embodied as a ball and socket joint, in order to act as a ball and socket joint, mating surfaces between connector portions of the connector assembly have to provide an interface permitting tilt adjustment. It is exactly this adjustment, which is obtained with flat mating surfaces, which renders the application unsuitable for fixing connector portions once aligned. If the flat mating surfaces are/remain not perfectly parallel to each other, the contact area between them is formed by a contact line instead of a contact surface. Such a contact line will not be able to withstand the forces experienced in practical offshore wind turbine situations. The tilt adjustment via a ball and socket type of connection also negatively influences scalability of the design.

Further prior art is formed by GB 2 468 926 and US 2007/267197, which have in common with the above-mentioned EP-A1-2 441 955 that a radially displaceable clamping element is actuated by art axially displaceable actuator. More specifically, each radially displaceable clamping element is actuated by an independent axially displaceable actuator.

U.S. Pat. No. 5,076,594, EP 2 077 363 and EP 3 064 309 are acknowledged as further prior art.

An object of the present invention is to provide an assembly, that is improved relative to the prior art and wherein at least one of the above stated problems is obviated.

Said object is achieved with the assembly according to the present invention, comprising a first and a second section, each section comprising a longitudinal axis, a fixation configured to fix the first and the second section, wherein at least one of the first and the second section comprises a body that is configured to be engaged by the fixation, and wherein the fixation comprises an abutment and a displaceable actuator, wherein the actuator is radially displaceable. The actuator is radially displaceable with respect to the longitudinal axis of the section that comprises the actuator. This allows the actuator itself to be employed as part of a clamp. In a preferred embodiment, the actuator may also be an integral part of the clamp.

The body that is engaged by the fixation is clamped between the abutment and the radially displaceable actuator, thereby reliably fixing the first and the second sections to each other. Additional fixation means, such as bolts according to the prior art, are redundant. Also, the body may be less bulky than a flange comprising through holes to accommodate a bolt. As a result, the assembly according to the invention, requires less material, is therefore more compact and lighter, and also more elegant. Whereas thick parts need to be forged, smaller parts may also be rolled, possibly allowing the sections to be formed with alternative and more attractive manufacturing methods. Also, the assembly according to the invention is scalable, providing the opportunity to arrange multiple fixations in axial direction of the sections.

A further advantage of the proposed assembly, is that it may be applied for connecting sections under the waterline. On the one hand, longitudinal sections of a limited length may be used, allowing smaller ships to transport them to a desired location for an offshore construction. On the other hand, the proposed assembly due to it's option to be arranged under the waterline, also allows offshore constructions to be arranged at deeper locations than was possible with the conventional bolted flanges.

The successively tightening the bolts of a bolted flange—which are typically tightened in multiple steps, as mentioned above—is very time consuming and labor-intensive. The proposed assembly is less labor-intensive and time consuming than a connection having bolted flanges.

Further preferred embodiments are the subject of the dependent claims.

In the following description preferred embodiments of the present invention are further elucidated with reference to the drawing, in which:

FIG. 3 is a perspective view of an assembly according to a first embodiment of the present invention;

FIGS. 4A and 4B are a cross sectional view of the assembly shown in FIG. 3;

FIGS. 7-11 shown successive steps of assembling an assembly according to a third embodiment of the present invention.

Figure 17A:
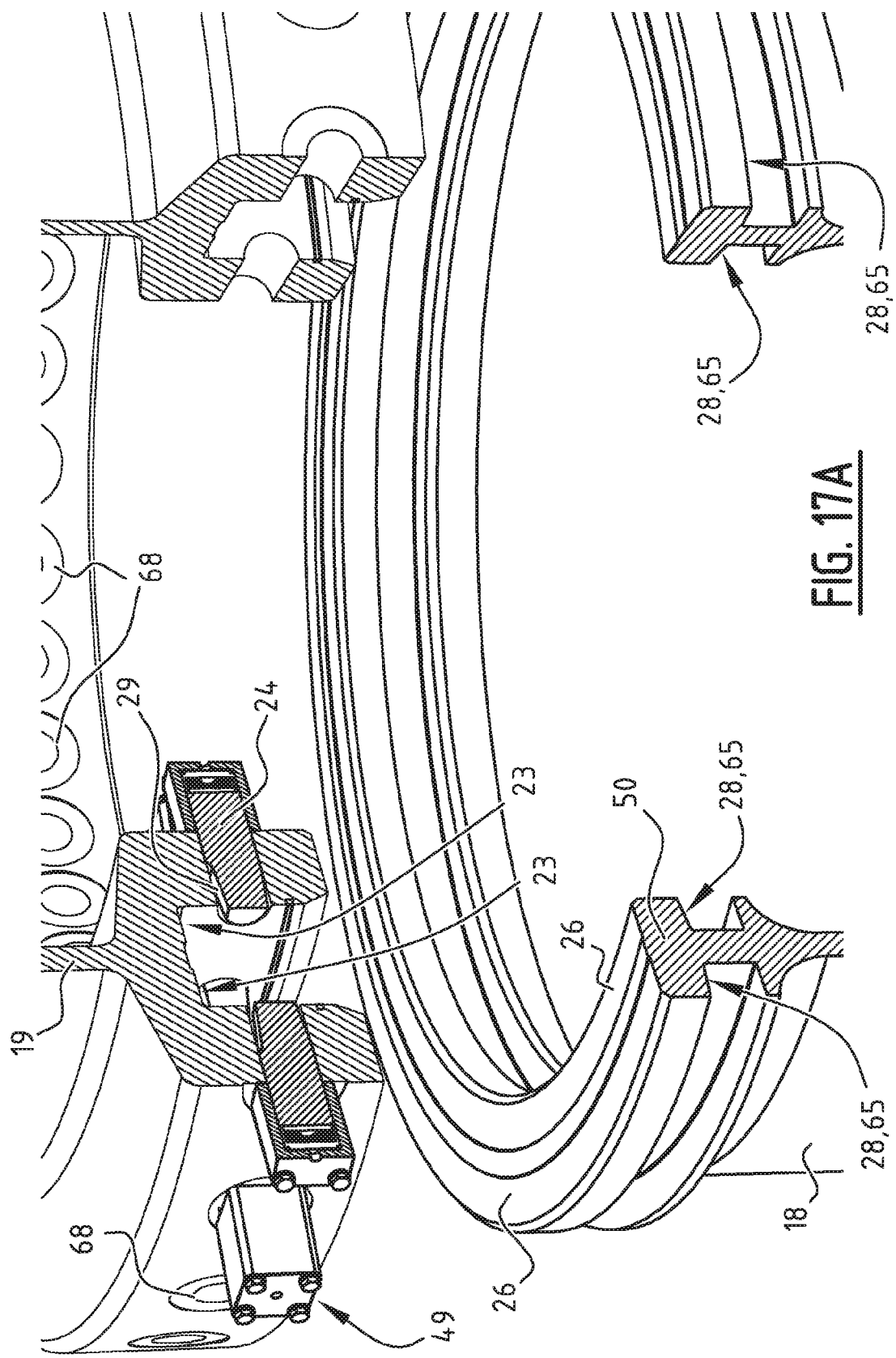
Figure 17B:
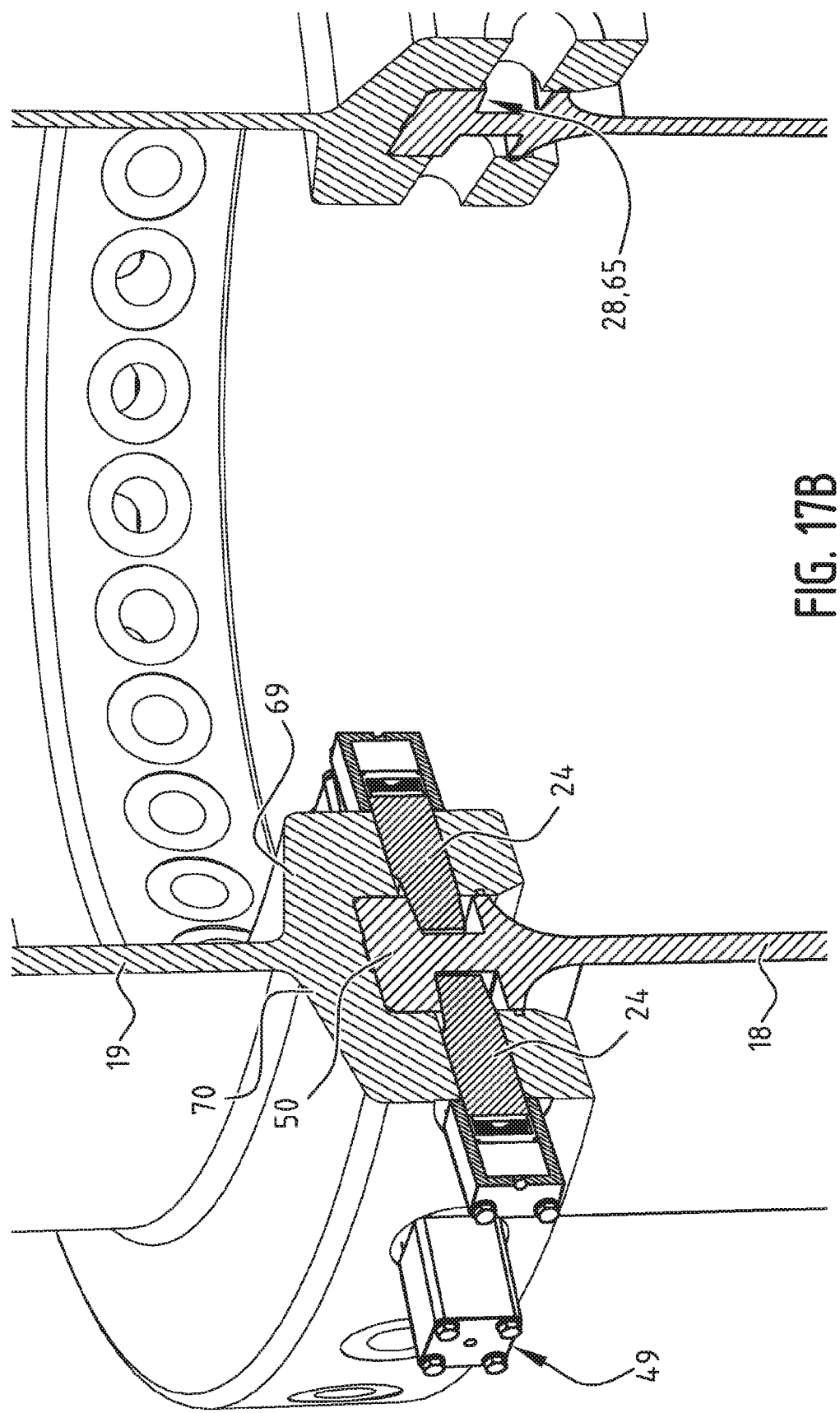

FIG. 12 is a perspective view of an assembly according to a fourth embodiment;

FIG. 13 is a cross sectional view of the assembly of FIG. 12;

FIG. 14 is a top view of a ring-shaped actuator of the assembly of FIG. 13;

FIGS. 15A-15D show successive steps of assembling an assembly according to fifth embodiment of the present invention;

FIGS. 16A-16D show successive steps of assembling an assembly according to embodiment of the present invention;

FIGS. 17A-17B show successive steps of assembling an assembly according to seventh embodiment of the present invention;

FIGS. 18A and 18B show a state wherein a section is temporarily fastened, e.g. for transport over sea on board of a vessel;

FIG. 19A shows a lifting tool;

FIG. 19B shows the lifting tool of FIG. 19A in engagement with a section; and

Figure 20:
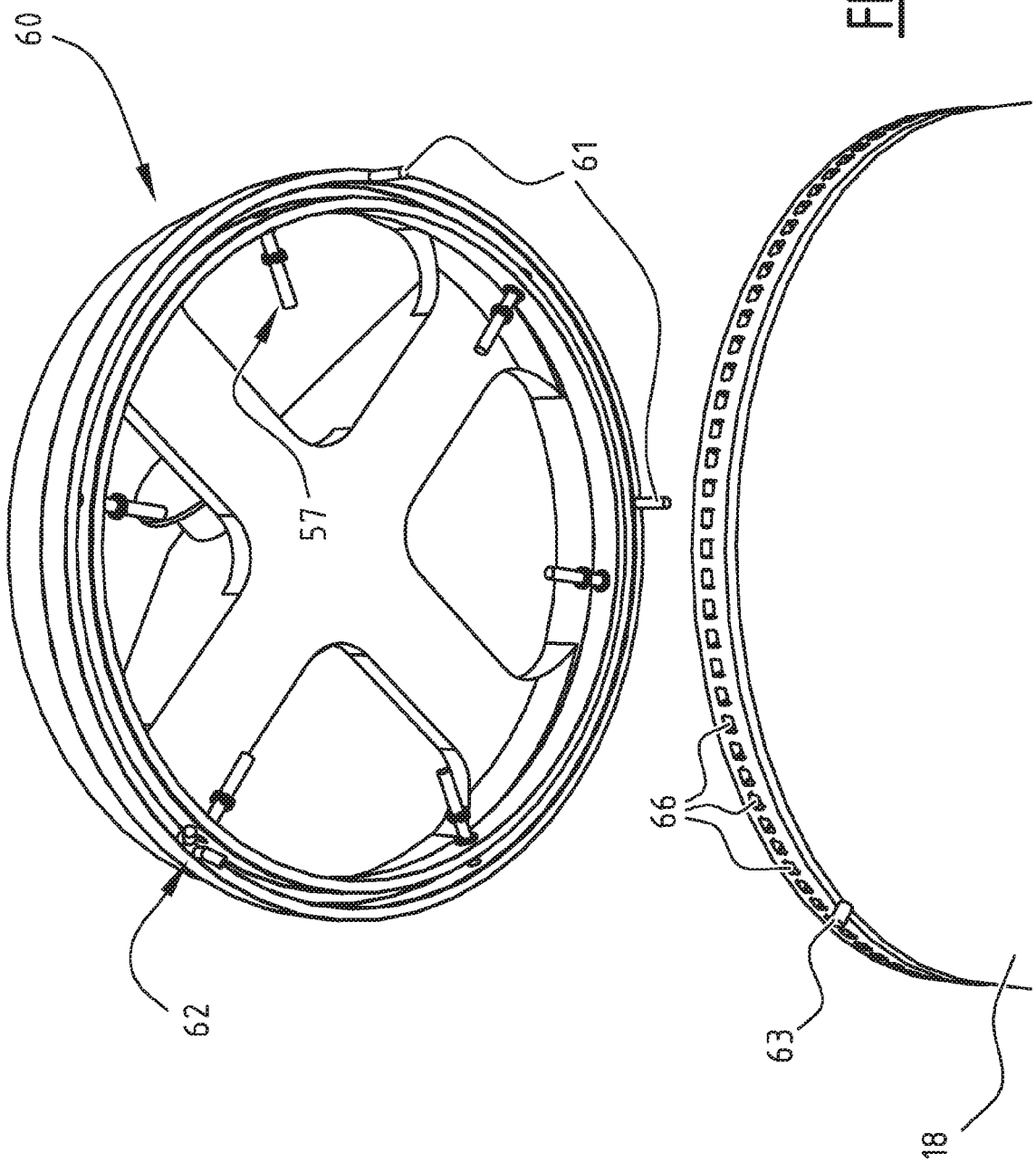

FIG. 20 shows a perspective view of a lifting tool above a to be lifted section.

Figure 1:
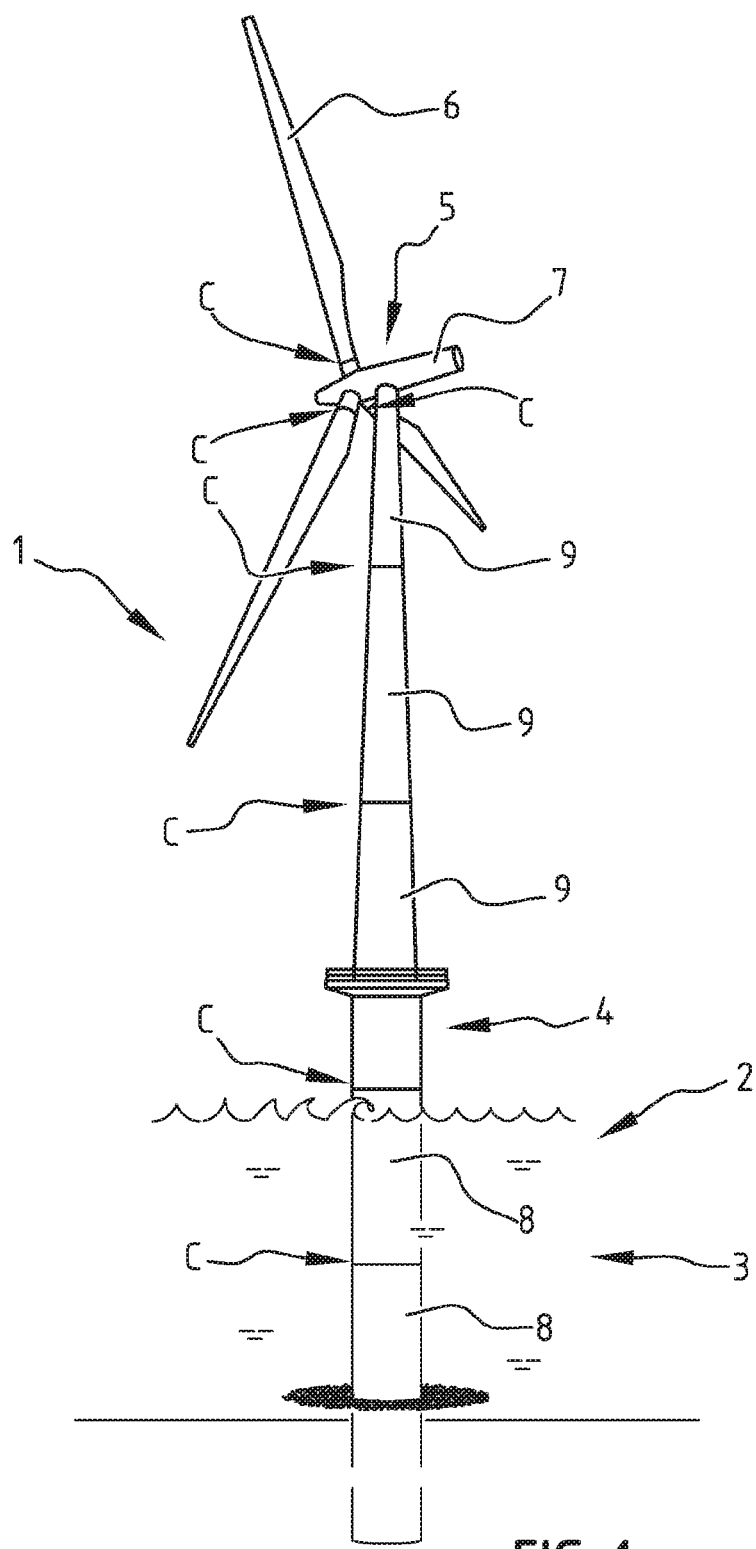
FIG. 1 is a schematic view of an offshore wind turbine tower supported by a monopile.

An example of an offshore construction comprising multiple connections C where an assembly according to the invention may be applied is shown in FIG. 1. An offshore wind turbine tower 1 is supported by a supporting base structure 2 which is in FIG. 1 embodied as a monopile 3 with a transition piece 4. The skilled person will understand that similar connections are present for alternative supporting base structures 2, such as (not shown) jackets.

The connections C may be applied between separate sections 8 of the monopile 3, between the monopile 3 and the transition piece 4, between the transition piece 4 and the turbine tower 1, between sections 9 of the turbine tower 1, and between a rotor blade 6 and a hub of a rotor.

During use, a wind turbine 5 will be oriented such that the rotor blades 6 are optimally driven by the available wind power. The rotor blades 6 drive a (not shown) generator in the nacelle 7, wherein the generator generates electricity. The wind turbine 5 causes alternating loads on any connection C in the construction, and dependent on the wind direction, specific parts of the connection C have to absorb most of the loads.

According to the prior art (FIG. 2), an assembly 10 configured to connect a first section 11 and a second section 12 normally comprises flanges 13, 14. These flanges 13, 14 are provided with through holes 15, 16, which are aligned. A bolt 17 and nut 40 assembly is then arranged through the aligned through holes 15, 16, and used to clamp the flanges 13, 14 to each other. As already described, currently M72 bolts 17 are used for connecting a wind turbine tower 1 to a monopile 3 or transition piece 4. The bolts 17 itself are heavy and the tools for tightening the bolts 17 are also heavy and hard to handle. Moreover, the preload on the bolts 17 must be regularly checked and adjusted, periodically requiring significant maintenance work.

In order to accommodate the through holes 15, 16 and withstand the clamping force by the bolts 17, the flanges 13, 14 need to be relatively thick in both axial and radial direction.

The assembly according to the present invention also comprises a first section 18 and a second section 19. Each section 18, 19 may be longitudinal, and may comprise a longitudinal axis 21, 22. The assembly further comprises a fixation 20 configured to fix the first 18 and the second section 19. However, instead of bolted flanges, the fixation 20 is embodied as an abutment 23 and a radially, i.e. transverse to a longitudinal axis 21, 22, displaceable actuator 24 that itself may be employed as part of a clamp 41. At least one of the first 18 and the second section 19 comprises a body 25 that is configured to be engaged by the fixation 20.

Figure 2:
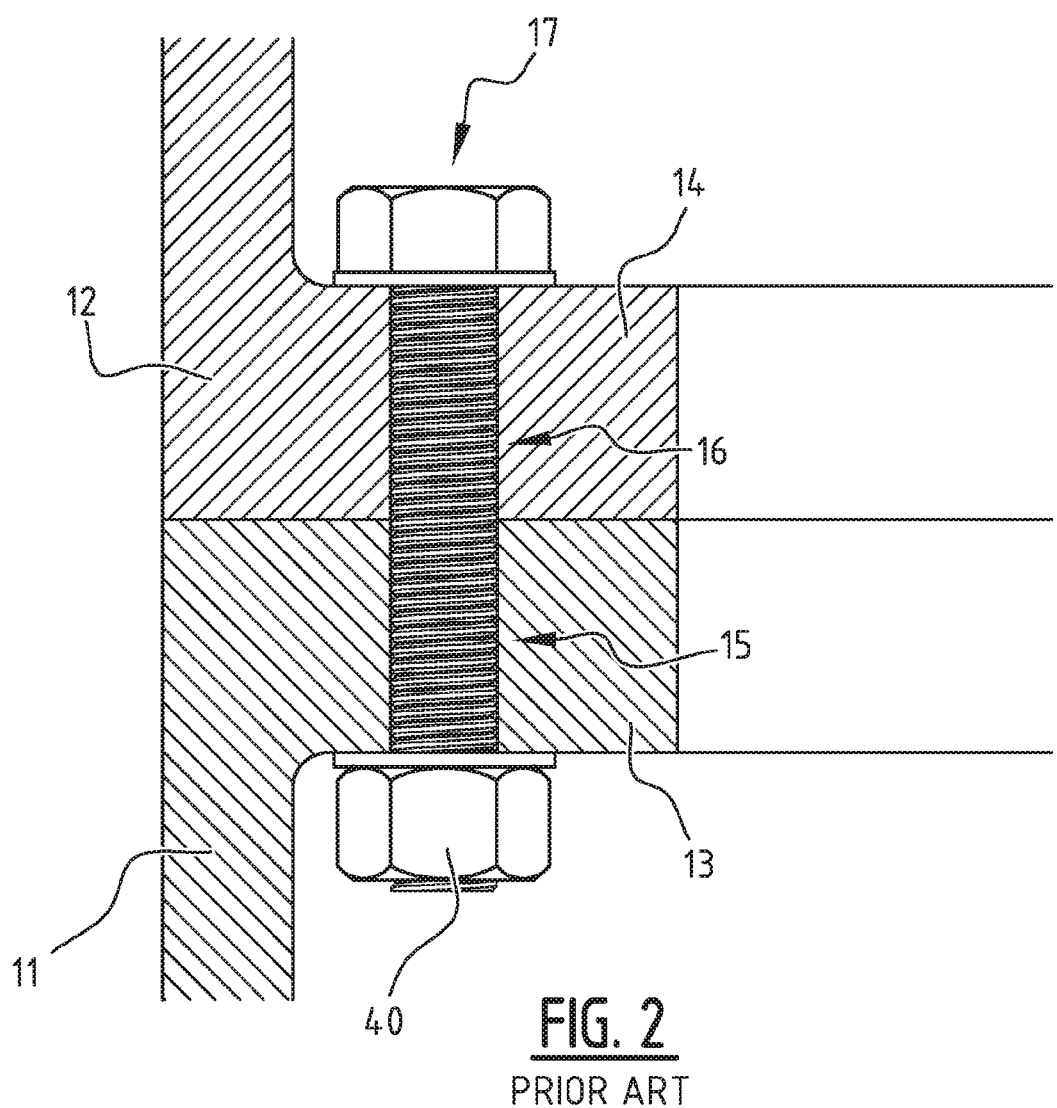
FIG. 2 is a cross sectional view of a flange connection according to the prior art.

By using a fixation 20 that renders conventional bolts 17 abundant, there is no need for through holes 15, 16, as shown in the prior art connection of FIG. 2, anymore. Consequently, the body 25 according to the invention can be less bulky than a conventional flange. This results in a more elegant design, requiring less material and possibly also allowing alternative manufacturing methods. Whereas thick parts need to be forged, smaller parts may also be rolled.

In the shown embodiments, the longitudinal axes 21, 22 of the first 18 and the second section 19 are at least parallel. In FIG. 3, the axes 21, 22 coincide, which is the preferred situation.

The abutment 23 is preferably part of the other of the first 18 and the second section 19. In the shown embodiments, the body 25 is part of the first section 18, and the abutment 23 is part of the second section 19.

The abutment 23 abuts against a support surface 26 of the body 25. This support surface 26 is oriented in radial direction with respect to the longitudinal axis 21 of the first longitudinal section 18.

In the shown embodiment, the body 25 comprises a radially extending protrusion, more specifically in the form of a flange 65. A flange 65, being a protrusion that extends along the circumference of the respective section 18, can, in contrast to a body 25 being formed between the support surface 26 and discrete recesses 42, 66, be engaged anywhere along the circumference. Therefore, the relative orientation between the first and second section 18, 19 is less or not critical if the body 25 is a flange. This is especially important for jacket constructions, where exact rotational positioning of multiple connected sections may not be guaranteed. Consequently, for jackets, a flange 65 may provide the required rotational freedom. Alternatively, a body 25 formed between the support surface 26 and discrete recesses 42, 66 may be applied if an optimal load transfer is to be obtained. In that case, the body 25 is arranged between the support surface 26 and a recess 42, 66 of the respective section 18.

The actuator 24 is preferably part of the other of the first 18 and the second section 19. In the shown embodiments, the body 25 is part of the first section 18, and the actuator 24 is part of the second section 19.

Preferably, both the abutment 23 and the actuator 24 are part of the other of the first 18 and the second section 19. In the shown embodiments, the body 25 is part of the first section 18, and the abutment 23 and the actuator 24 are both part of the second section 19. In this way, the second section 19 partly encloses the body 25 of the first section 18. Thus, abutment 23 and radially displaceable actuator 24 together define a clamp 41 configured for clamping the body 25 in between. The clamping action of this clamp 41 is directed in the axial direction of the assembly. Using actuator 24, the body 25 is clamped between the abutment 23 and the actuator 24, thereby providing a reliable fixation between the first 18 and second section 19. Furthermore, additional fixation means, such as bolts 17 according to the prior art (FIG. 2), are redundant. Also, the body 25 may be less bulky than a flange 13, 14 comprising through holes 15, 16 to accommodate a bolt 17.

The actuator 24 has a contact surface 29 that is configured to engage a mating engagement surface 28 of the body 25. The contact surface 29 and the engagement surface 28 correspond to each other in order to form a mating interface.

The support surface 26 and the engagement surface 28 are arranged on opposite sides of the body 25, and are clamped by clamp 41. The body 25 is a tolerance critical part of the first section 18. The body 25, and the support surface 26 and engagement surface 28 thereof, need to correspond to the dimensions of the fixation 20.

The contact surface 29 of the actuator 24 and the engagement surface 28 of the body 25 comprise a corresponding chamfer. When the chamfer of the contact surface 29 and the chamfer of the engagement surface 28 are substantially equal, a reliable mating interface is obtained. Due to the chamfer, a radial displacement of the actuator 24 is converted to a clamping action of clamp 41, wherein the body 25 is clamped between the abutment 23 and the contact surface 29 of the actuator 24. The axial clamping force of the clamping action may be gradually increased or decreased by radial displacement of the actuator 24.

The chamfer of the contact surface 29 and/or the chamfer of the engagement surface 28 has an angle of less than 25°, preferably less than 20°, more preferably less than 15°, and most preferably equal to or less than 10°. By providing a chamfer with a relatively flat angle, it is possible to apply a relatively high axial clamping force $F_c$ with a relatively small radial actuation force $F_\mu$. The angle of the chamfer functions as a lever.

A high axial clamping force of clamp 41 provides the advantage that the assembly is less susceptible for load variations. This is best understood when compared to how a bolted joint carries a direct load. An adequately pre-tensioned bolt can survive in an application that an untightened, or loose bolt, would fail in a matter of seconds. In short, the effect of an applied load first decreases a clamp force of the bolt, before the bolt starts to actually 'feel' any of the applied force.

A further advantage of a chamfer with a relatively flat angle follows from a force decomposition (FIG. 4B). When the fixation 20 clamps the body 25 between the abutment 23 and the actuator 24 of the fixation 20, the clamping force $F_c$ will try to pivot the actuator 24 around the pivot points 30 and 31. This results in friction in the interface between the contact surface 29 of the actuator 24 and the engagement surface 28 of the body 25, wherein:

$$F_{friction} = \mu * F_{pressure}$$

and μ is the friction coefficient. If the chamfer has a relatively flat angle, the force $F_d$ will remain smaller than the friction forces in points 30 and 31. As a result, the clamping action will not be able to displace the actuator 24 away from the body 25. In this way, a secure fixation is guaranteed.

The radially displaceable actuator 24 is arranged in a radial bore 32 of the other of the first 18 and the second section 19. The actuator 24 is preferably arranged in said bore 32 with a sliding fit or press-fit. In the embodiment shown in FIG. 4, two seals 33, e.g. o-rings, seal the actuator 24 in the bore 32.

Figure 5:
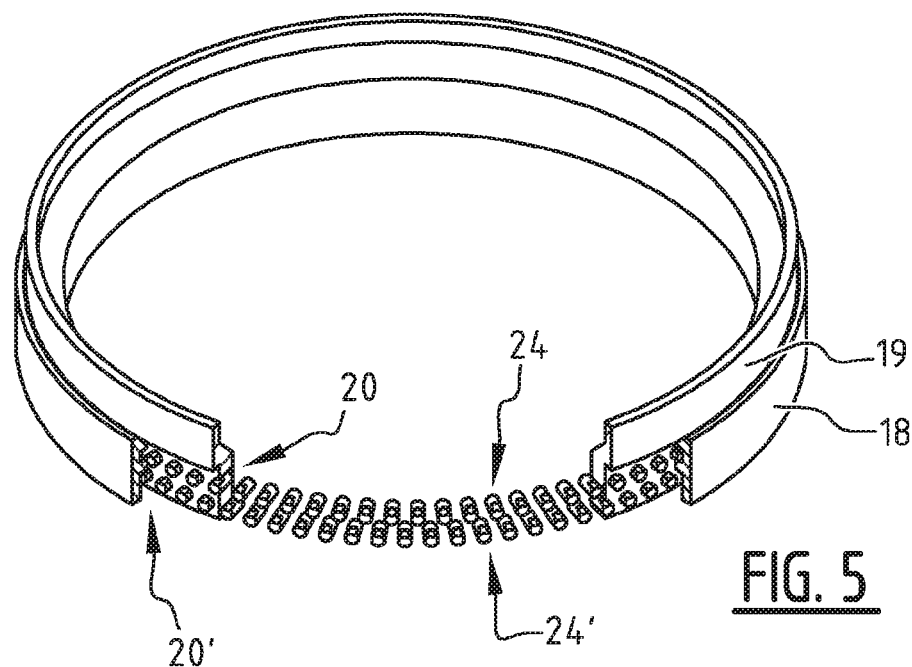
FIG. 5 is a perspective view of an assembly according to a second embodiment of the present invention.
Figure 6:
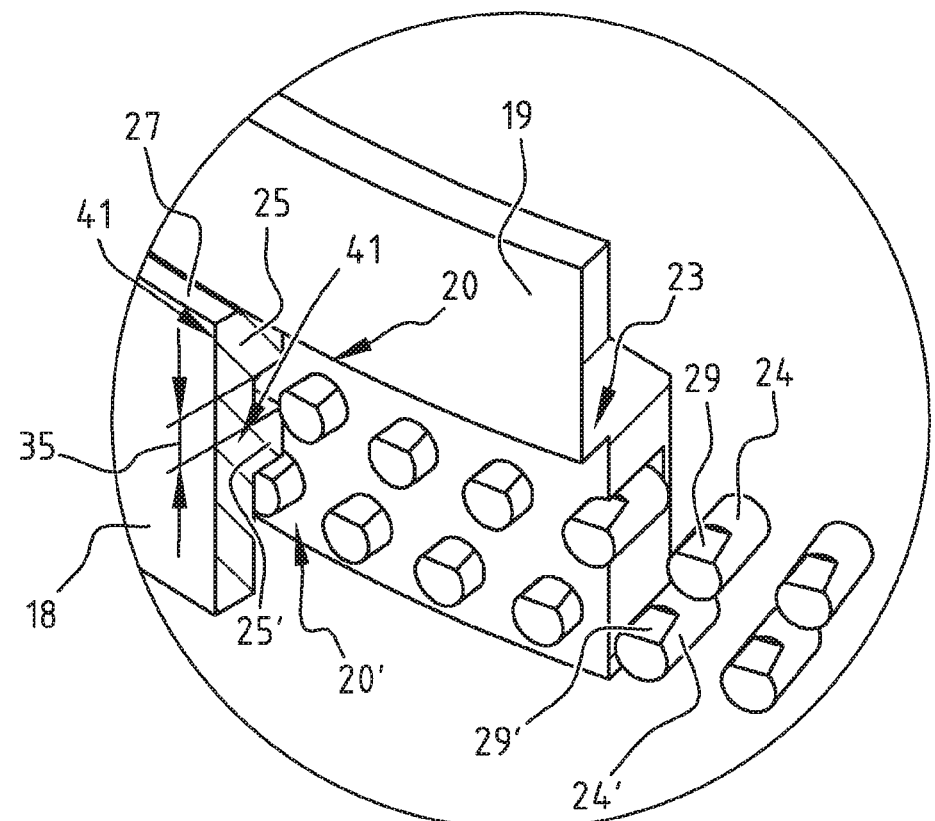
FIG. 6 is a detailed perspective view of the assembly shown in FIG. 5.

As shown in FIGS. 3, 5 and 6, multiple radially displaceable actuators 24 are arranged along the circumference of the other of the first 18 and the second section 19. Using multiple radially displaceable actuators 24, the clamping force for fixing the first 18 and the second section 19 is distributed. This on the one hand increases the reliability of the assembly by distributing the force over multiple surfaces. On the other hand, it also distributes the position of the clamping surfaces over the circumference. This is especially advantageous for wind turbines, which are exposed to forces which have an orientation that is dependent on the wind direction.

Although the skilled person could envisage alternative ways of radially displacing the actuator 24, the one or more than one actuator 24 is preferably hydraulically displaced.

In a preferred embodiment, more than one radially displaceable actuator 24 are connected to and driveable by a common source 43. If the actuators 24 are hydraulically displaced, the common source 43 may be a common pump 44. With a common pump 44, multiple actuators 24 may be simultaneously pressurized and displaced. In this way, the clamping action may be actuated fast and simple, contrary to prior art solutions wherein each radially displaceable clamping element is actuated by an independent axially displaceable actuator. A channel 46 interconnecting multiple pressure chambers 34 may be arranged in the second section 19.

The one or more than one actuator 24 preferably being hydraulically displaced also allows for a further preferred embodiment, wherein a hydraulic fluid used for displacing the actuator 24 remains in the pressure chamber 34.

The pressure chamber 34 may comprises a one-way inlet valve configured to introduce the hydraulic fluid into the pressure chamber 34.

In a further preferred embodiment, the hydraulic fluid is configured to cure and thereby transform into a substantially solid state. In this way, the solidified hydraulic fluid forms a substantially rigid securing, preventing that the actuator 24 may move back towards the pressure chamber 34.

FIGS. 5 and 6 show a further embodiment, wherein at least one of the first 18 and the second section 19 comprises at least one additional body 25' that is configured to be engaged by an additional fixation 20'. The additional fixation 20' comprises at least one additional radially displaceable actuator 24'. The abutment 23 of the second section 19 is also the functional abutment of the additional fixation 20'. The clamping force applied by the actuator 24' on additional body 25' is transferred via the wall of the first section 18 towards body 25 that has a support surface 26 that engages abutment 23.

The body 25 and the additional body 25' are arranged at an axial distance 35. This provides a scalable design.

In the embodiment of FIGS. 5, 6, the fixation 20 and the additional fixation 20' each comprise multiple radially displaceable actuators 24, 24', wherein the actuators 24 of the fixation 20 are arranged in a staggered arrangement with respect to the actuators 24' of the additional fixation 20'.

In all shown embodiments, at least the section 18 that comprises the body 25, further comprises a hammering surface 27. As mentioned before, the body 25 is a tolerance critical part of the first section 18. After all, the body 25, and the support surface 26 and engagement surface 28 thereof, need to correspond to the dimensions of the fixation 20. By providing a separate hammering surface 27, that is configured to drive the respective section 18 into the ground with a ram, it is prevented that the body 25 with support surface 26 and the engagement surface 28 is hammered on. Therefore, the tolerances of the body 25 can be maintained, thereby safeguarding a reliable fixation between the first 18 and the second section 19.

In the embodiment of FIGS. 7-11, the hammering surface 27 is arranged on a wall 36 extending from the section 18 past the support surface 26. The hammering surface 27 being arranged at another level than then support surface 26, eliminates the risk of the tolerance sensitive support surface 26 being hammered on by a rain.

In FIGS. 7-11, successive steps of assembling an assembly according to a third embodiment of the present invention are shown.

Figure 7:
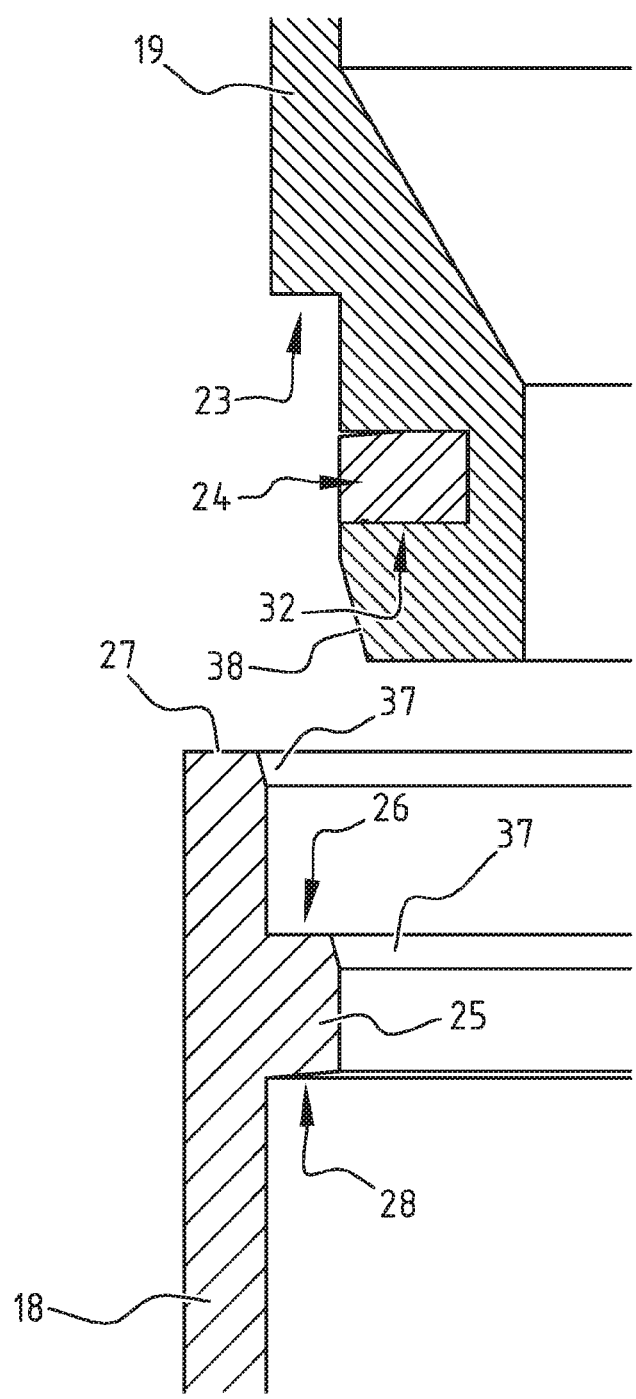

In FIG. 7, the first 18 and second section 19 are shown in a pre-assembled state, at a distance from each other. In the embodiment shown, both of the first 18 and the second section 19 comprise one or more than one chamfered guide surface 37, 38. The axially chamfered guide surfaces 37 of the first section 18, and the axially chamfered guide surface 38 of the second section 19, facilitate guidance of the sections 18, 19.

Figure 8:
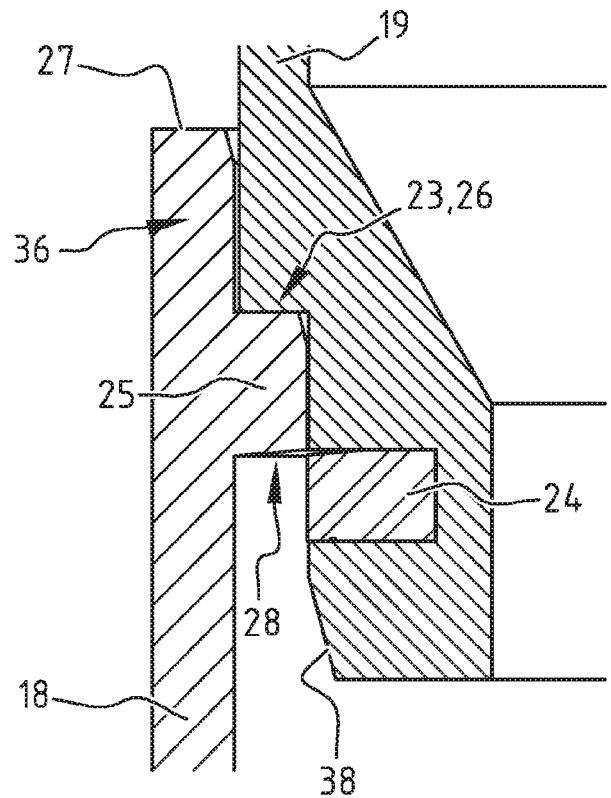

In FIG. 8, the abutment 23 of the second section 19 abuts against, and is supported by, the support surface 26 of the first section 18.

Figure 9:
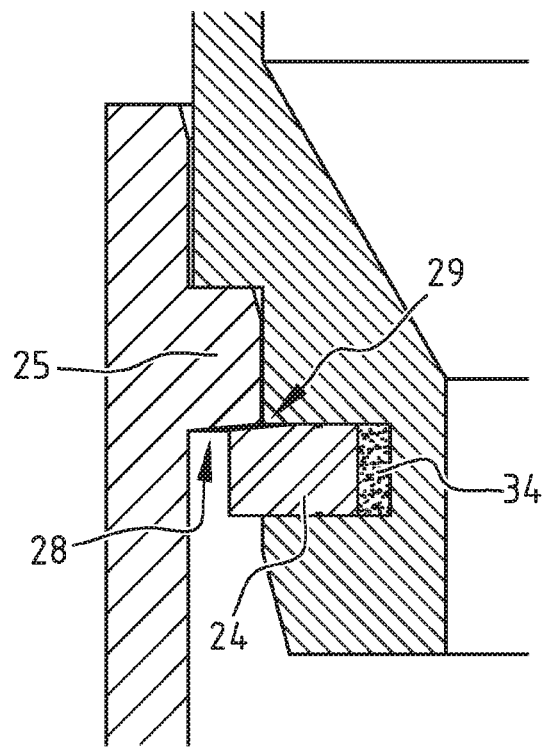

In FIG. 9 the actuator 24 is radially displaced, wherein the contact surface 29 of the actuator 24 engages the engagement surface 28 of the body 25 of the first section 18. Due to the chamfer of the contact surface 29 and the engagement surface 28, a clamping action is performed.

Figure 10:
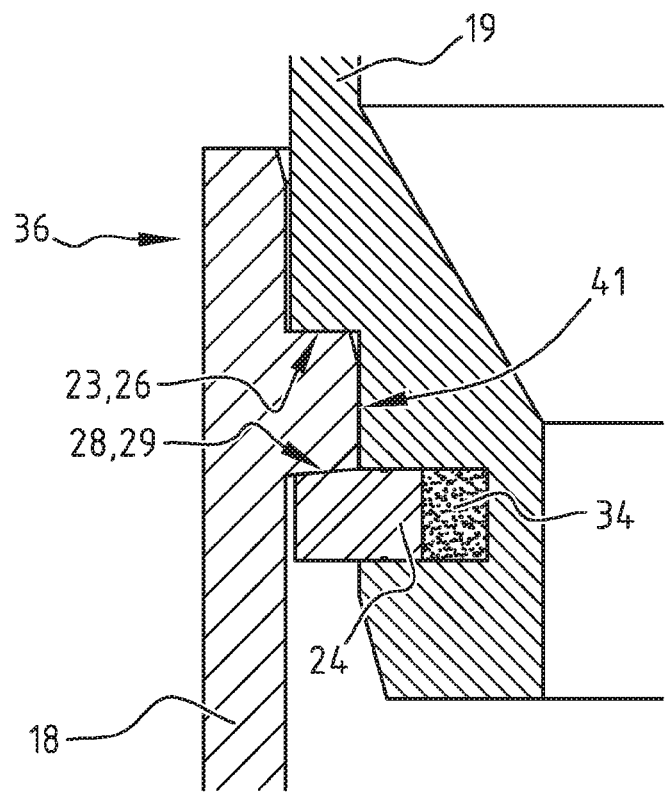

In FIG. 10, the body 25 is clamped between the abutment 23 and the actuator 24, thereby providing a reliable fixation between the first 18 and second section 19.

Figure 11:
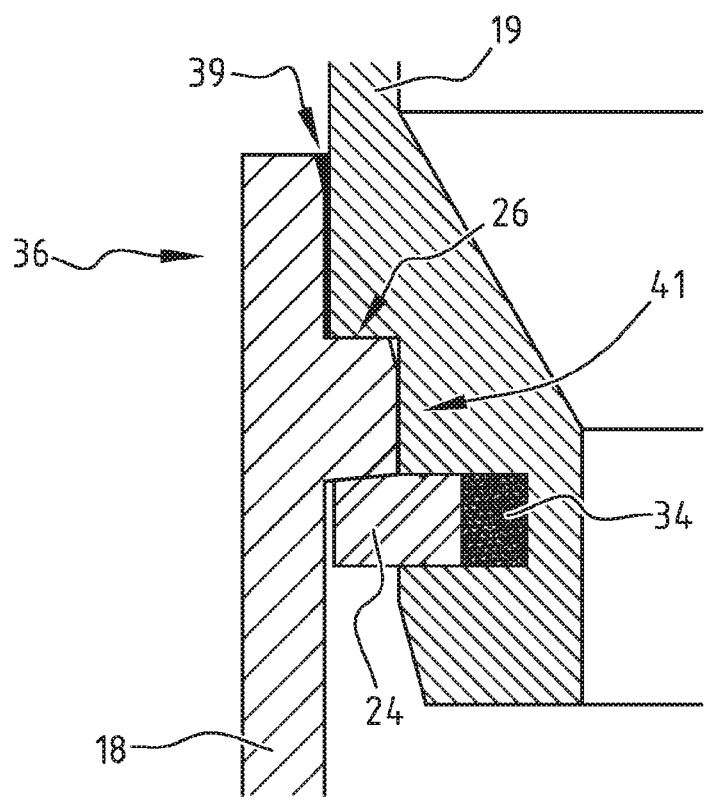

In FIG. 11, a seal 39 is arranged between the wall 36 extending from the first section 18 past the support surface 26 and the second section 19. If an hydraulic fluid is used for displacing actuator 24, it preferably remains in pressure chamber 34. In a preferred embodiment, the hydraulic fluid solidifies once cured. The solidified state is shown in FIG. 11. Alternatively, or in combination, a (not shown) one-way inlet valve may be applied.

In a not shown further preferred embodiment, the actuator 24 may be elastically pre-tensioned. This can be achieved by using a compressible hydraulic fluid in pressure chamber 34, or by appropriate design or material choice of the actuator 24 itself.

In the shown embodiments, the first 18 and the second section 19 are tubular sections. They are preferably sections of an offshore construction, such as shown in FIG. 1.

A further embodiment, wherein three fixations 120, 120' and 120" are applied, is shown in FIGS. 12-14. For this and the further embodiments described below, similar reference numbers apply to the similar features as for the earlier described embodiments, although some features are now present in plural. Each fixation 20, 20' and 20" comprises a ring-shaped radially displaceable actuator 24, 24', 24". Each ring-shaped actuator 24, 24', 24" comprises a plurality of ring segments 47. A seal 133 is arranged in a recess 48. The operating principle of this embodiment is similar to the previously described embodiments. Therefore, a detailed description of all features is omitted here.

An improved and more robust clamping action may be obtained with a symmetrical clamping action that is provided by the fifth embodiment (FIGS. 15A-15D), the sixth embodiment (FIGS. 16A-16D) and the seventh embodiment (FIGS. 17A-17B) described here below. The fifth and seventh embodiment both describe clamping from two opposing sides of the first section 18, whereas the sixth embodiment obtains symmetrical load transfer from one side. This one side is preferably an inner side of a section 18, 19, as further explained below. The symmetrical clamping action is beneficial, because it allows a load to be distributed over two sides, i.e. distributed over an inner flange 69 and an outer flange 70, and preferably in line with the load bearing walls of connected sections. The second section 19 comprises near its end an inner flange 69 and an outer flange 70 which are spaced apart and configured to receive the first section 18 there between.

Successive steps of assembling an assembly according to fifth embodiment of the present invention are shown in FIGS. 15A-15D that show a symmetrical arrangement having radially displaceable actuators 24 that are arranged on opposite sides of the first section 18. Contrary to the embodiment shown in e.g. FIGS. 4A, 4B, the second section 19 divides near its end in an inner flange 69 and an outer flange 70. The inner flange 69 resembles the FIG. 4 embodiment, while the outer flange 70 is an extra flange relative to the FIG. 4 embodiment. Both inner flange 69 and outer flange 70 function similar, causing the axial load exerted by and caused by the second section 19 to be symmetrically divided over the inner flange 69 and the outer flange 70, and via the connection to the first section 18.

Figure 15A:
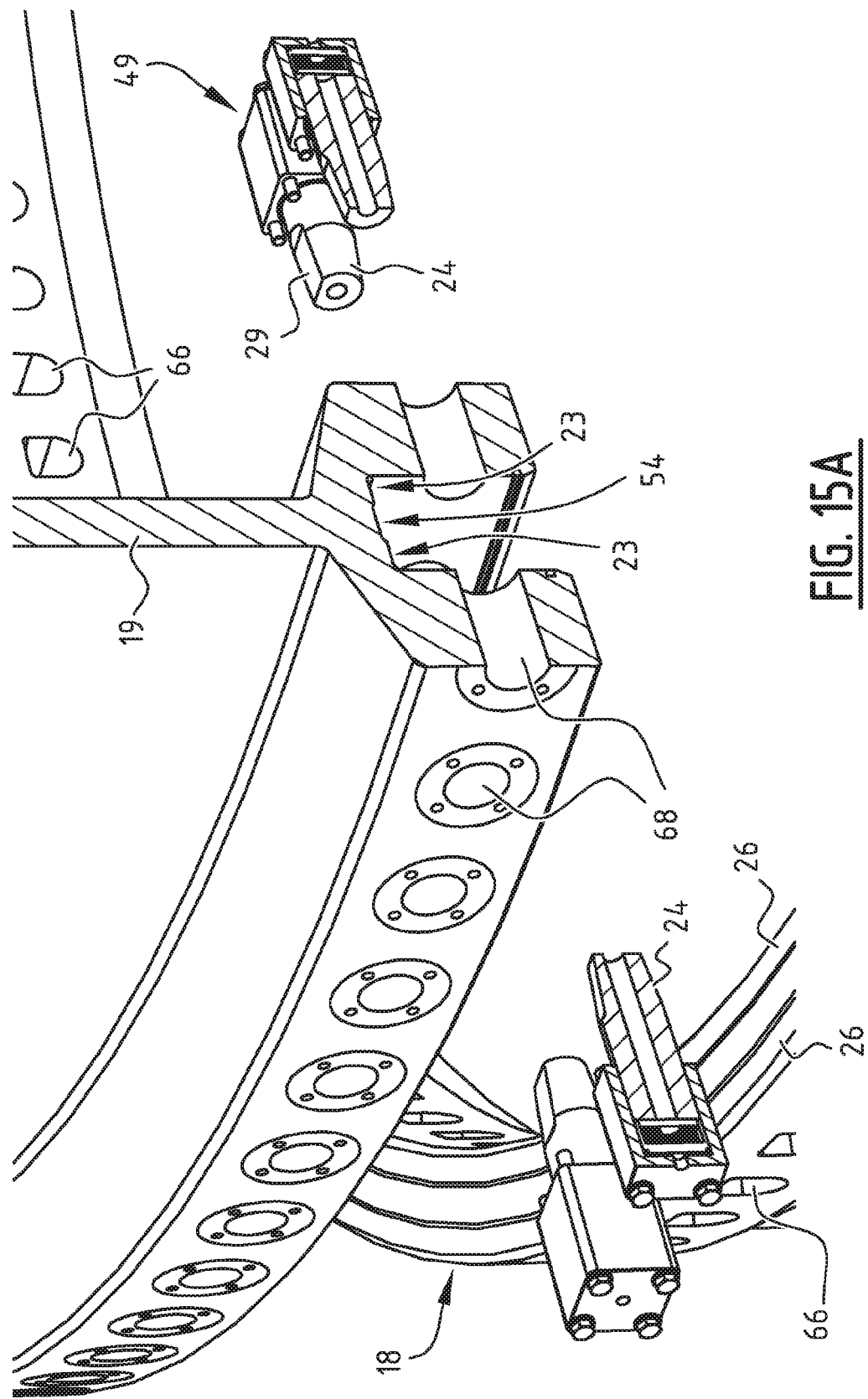
Figure 15B:
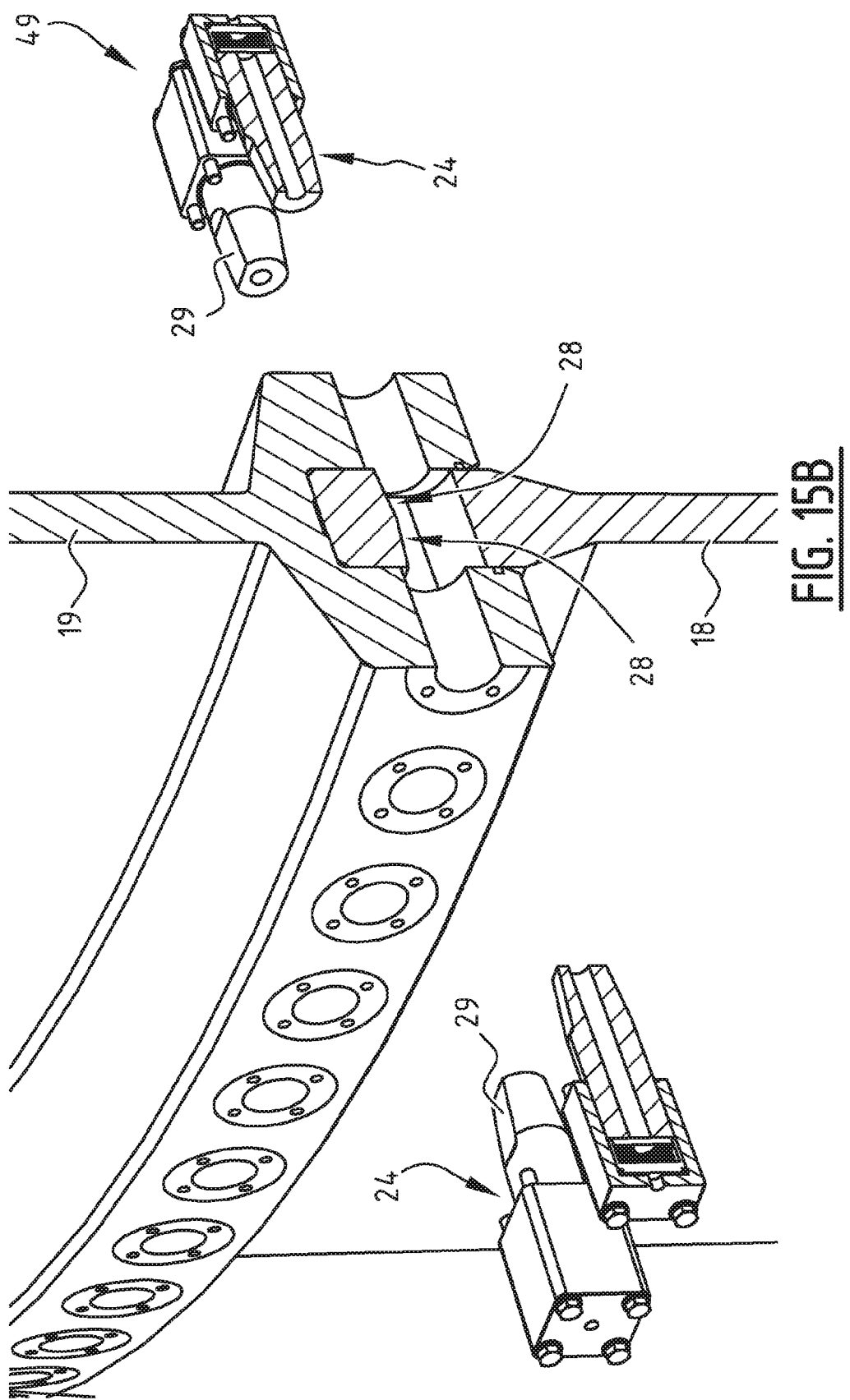
Figure 15C:
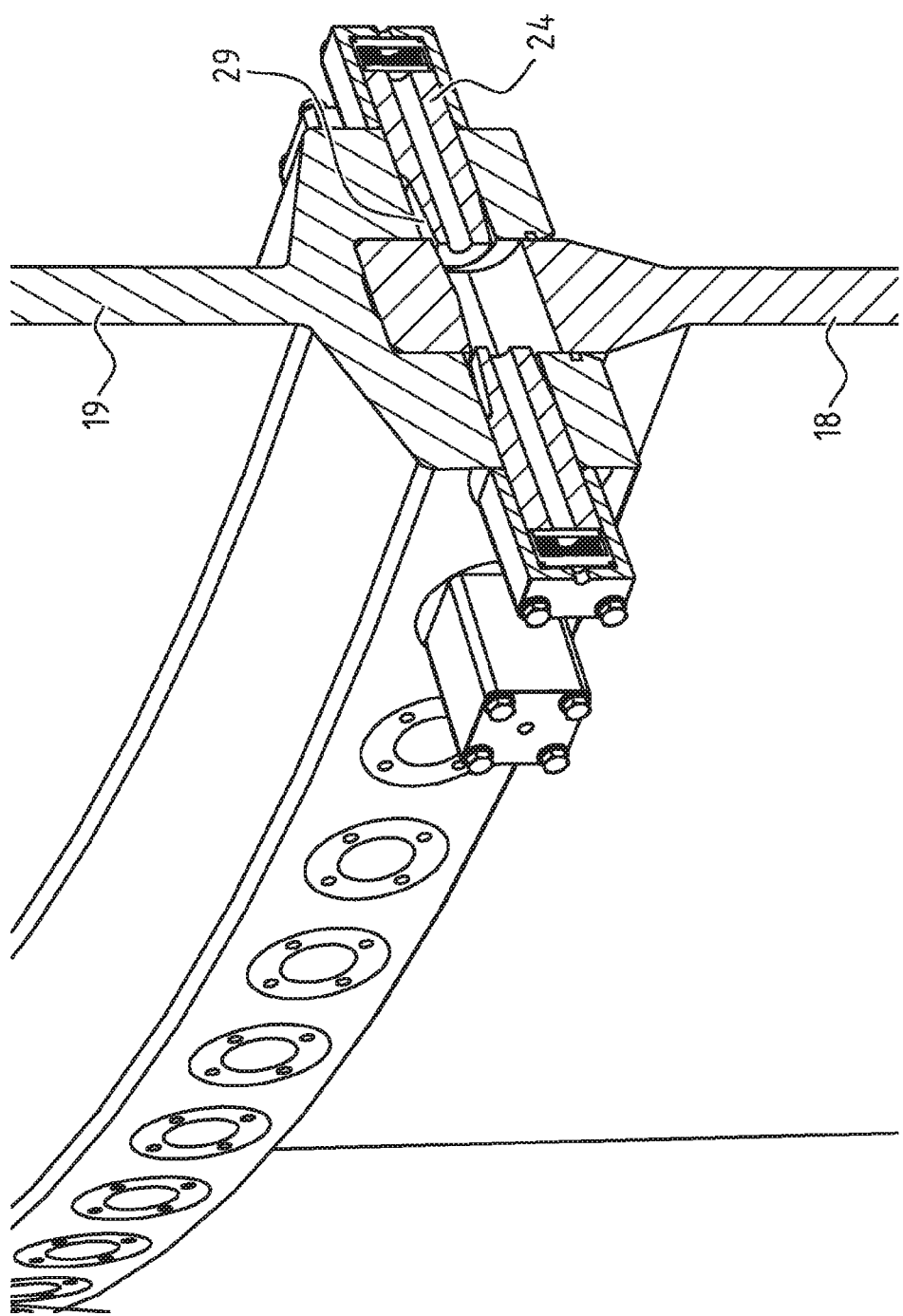
Figure 15D:
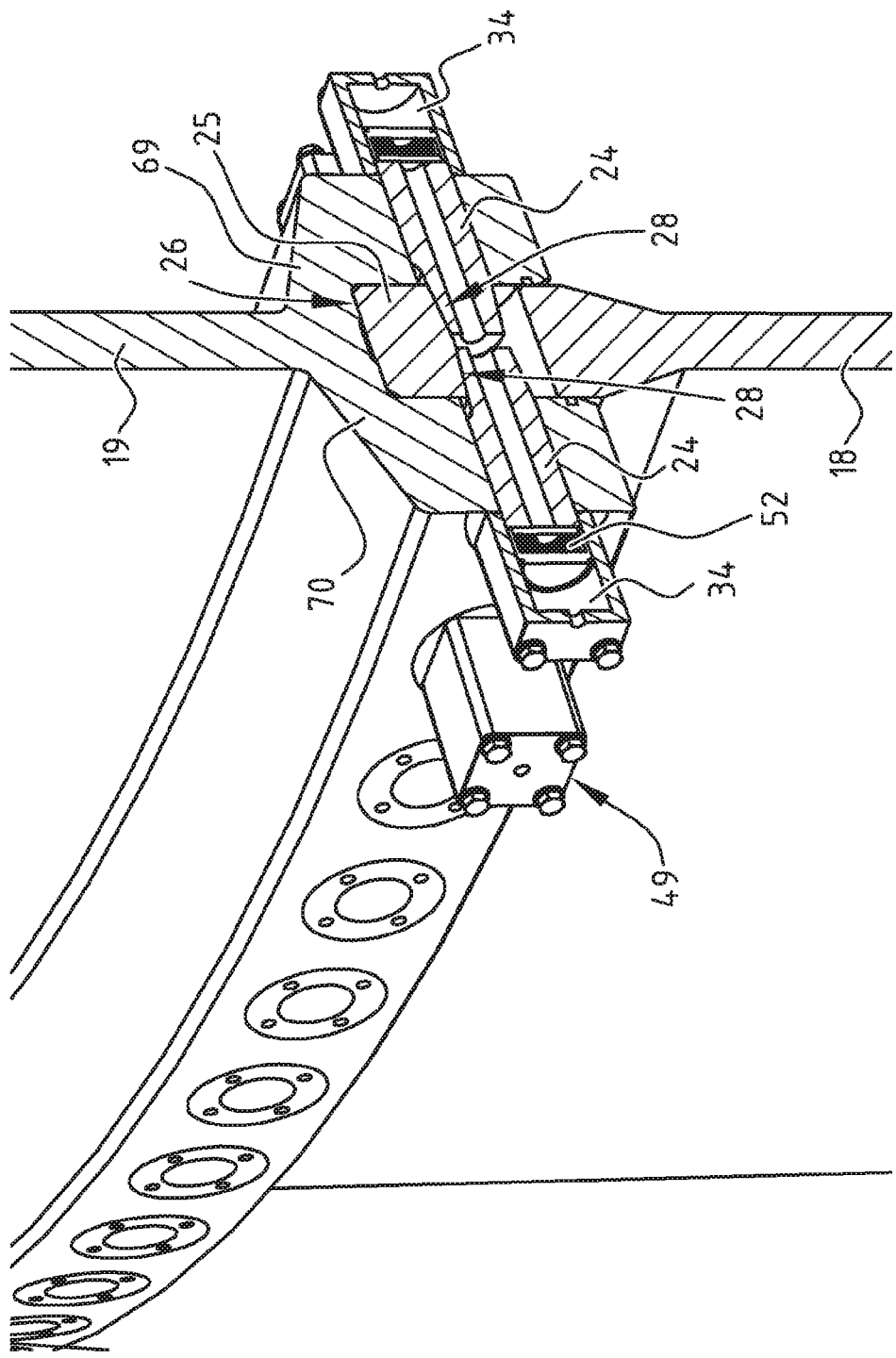
Figure 16A:
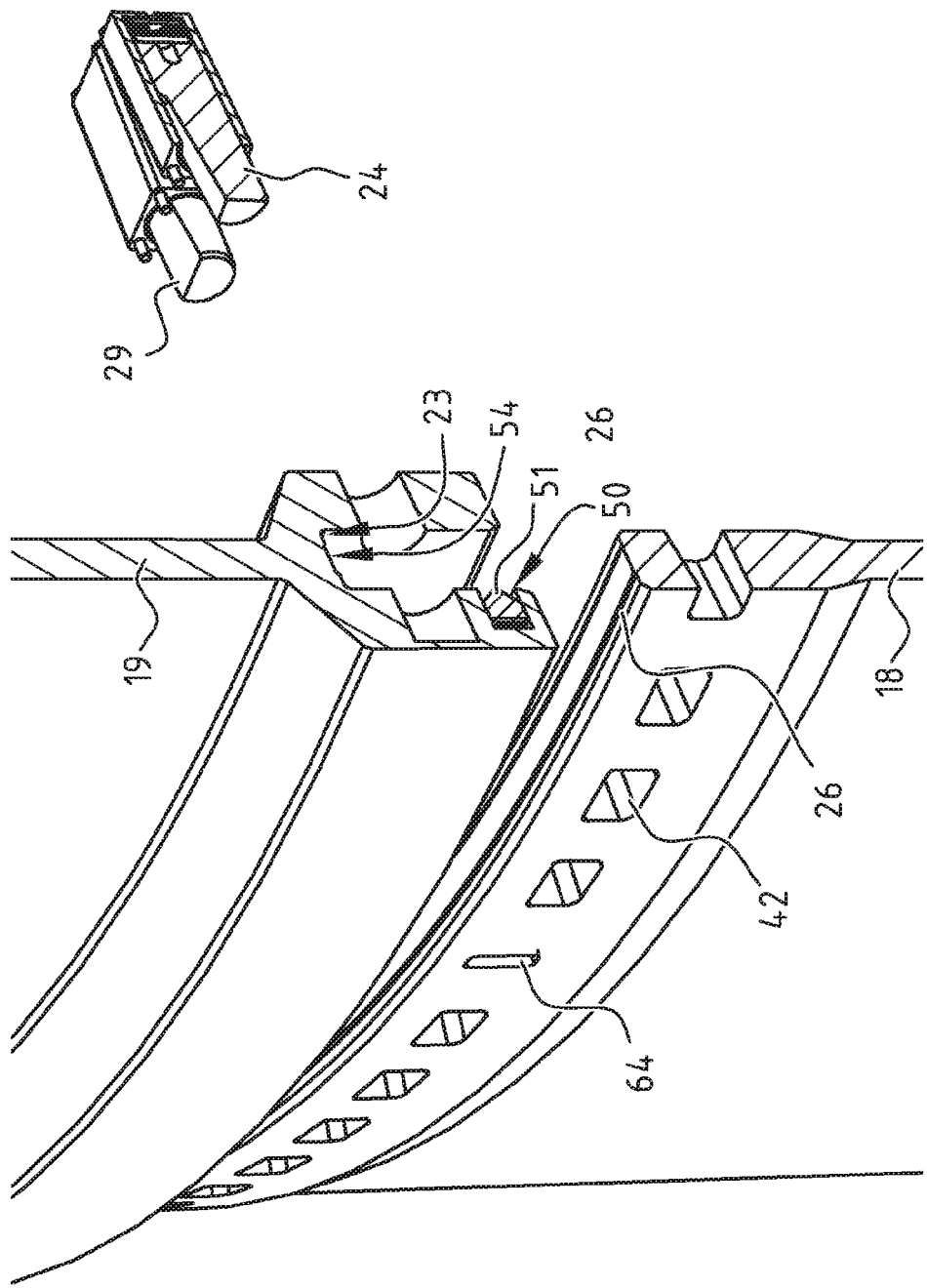
Figure 16C:
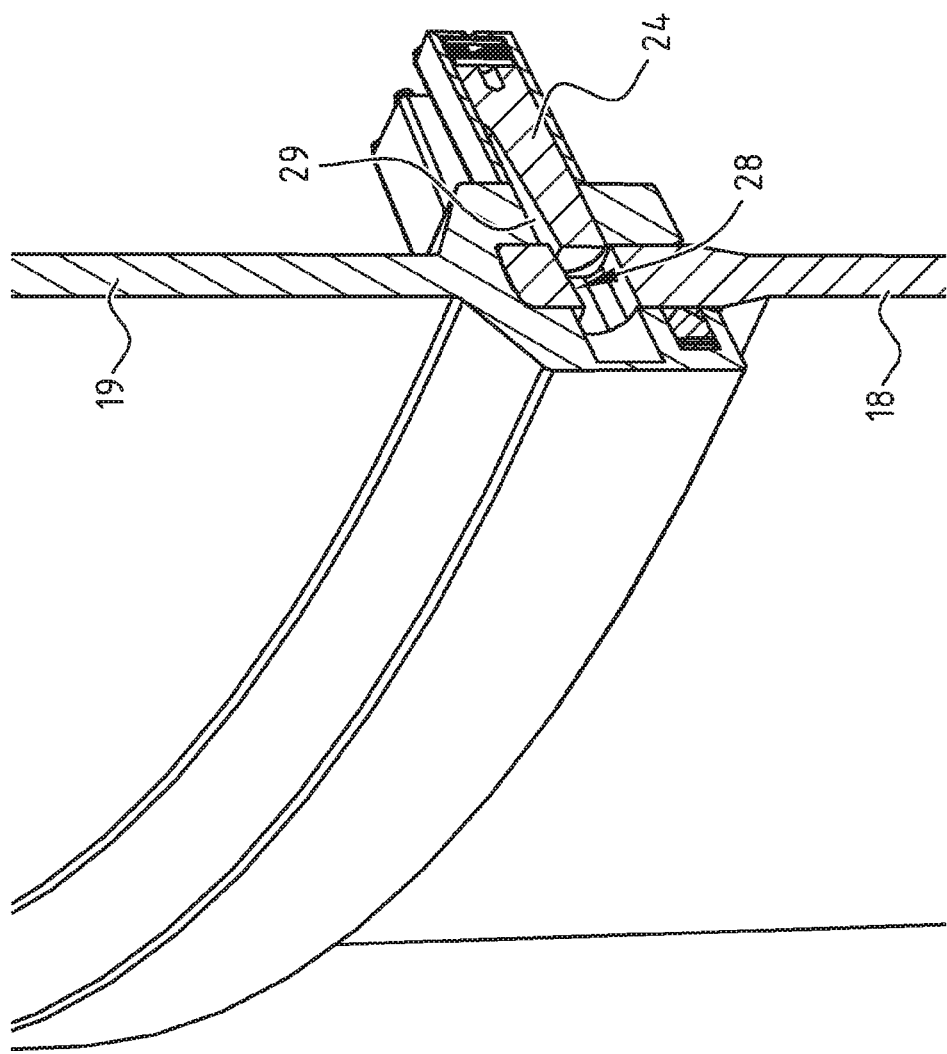
Figure 16D:
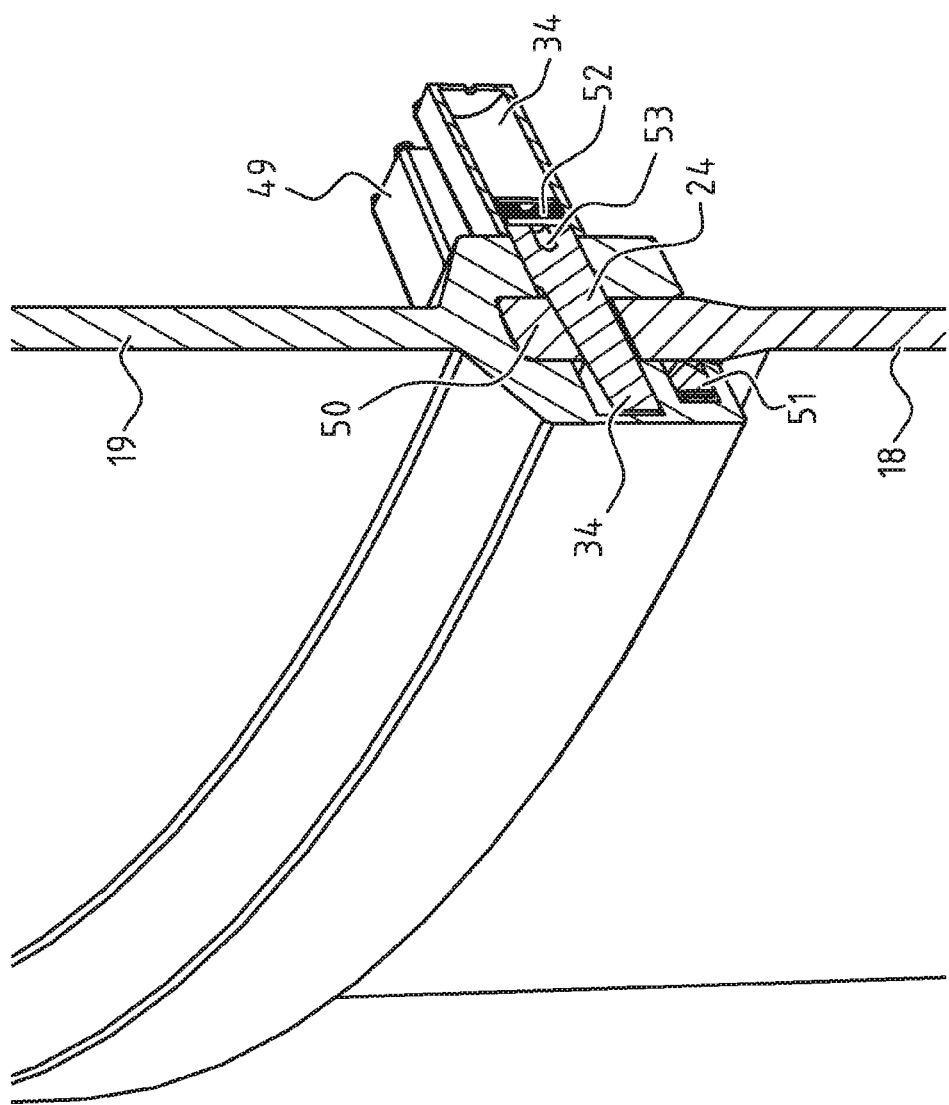

The first 18 and second section 19 that are arranged at a distance in FIG. 15A, are in contact in FIG. 15B. In FIG. 15C, the actuator housings 49 are arranged on the second section 19. Finally, in FIG. 15D, the actuators 24 are actuated, providing an axial compressive action using a (not shown) hydraulic fluid in pressure chamber 34. Spring washers 52 may provide a pre-compression.

The operating principle of this embodiment is similar the previously described embodiments. Therefore, a detailed description of all features is omitted here. For illustration purposes, only a few actuator housings 49 are shown. Typically, such actuator housings 49 are in advance arranged along the whole circumference of the second section 19, i.e. at every position of a bore 68. In use, the actuators 24 extend from the actuator housing 49 through said bore 68. The body 25 is defined between the support surface 26 and the recesses 66. Because the bore 68 is a through hole, it allows the radially displaceable actuator 24 to pass through said bore 68 and into the recesses 66, which are now also embodied as a through hole (FIG. 15B). Each actuator 24 engages with its contact surface 29 the mating engagement surface 28 of the body 25. The actuator housings 49 are preferably releasable connected to the respective section, i.e. second section 19 in FIG. 15A-15D, in order to allow them to be replaced by alternative housings with a dual-action driver 57. This will be further clarified using the embodiments of FIGS. 18-20.

Abutments 23 abut against corresponding support surfaces 26 of the body 25. Between the abutments 23, there is arranged a recess 54.

Successive steps of assembling an assembly according to sixth embodiment of the present invention are shown in FIGS. 16A-16D. The radially displaceable actuator 24 is arranged on one of the inner flange 69 and the outer flange 70 and is configured to extend from the one of the inner flange 69 and the outer flange 70 through the first section 18 towards the other of the inner flange 69 and the outer flange 70, wherein the radially displaceable actuator 24 is suspended by both the inner flange 69 and the outer flange 70 when the fixation fixes the first 18 and the second section 19. In the shown embodiment, the radially displaceable actuator 24 is arranged on the inner flange 69, causing the radially displaceable actuator 24 to be arranged inside the monopile tower, where it is readily available for servicing and protected against outside influences such as salt sea water. The symmetrical clamping action provided by this embodiment is beneficial, because the actuator 24 is suspended on opposite sides, and will thus distribute a load over both suspended sides without tilting. An actuator 24 that is suspended on opposite sides will be exposed to a bending force that is distributed. Contrary to embodiments with an actuator 24 that is suspended on one side, e.g. the FIG. 4 embodiment, tilting of the actuator 24 is prevented when it is suspended on opposite sides conform the FIG. 16 embodiment.

A further advantage of the FIG. 16 embodiment is that actuators 24 need to be arranged on one side only, and that the number of actuators 24 is significantly reduced relative to the embodiments shown in FIGS. 15 and 17. Moreover, if the actuators 24 are arranged on the inner flange, they can be easily reached for service, and they can be arranged below the water line without being exposed to sea water. After all, the inner flange 69 comprises a through hole and the outer flange 70 a recess with a wall shielding the displaceable actuator 24 from seawater. An inflatable seal 51 arranged in a recess 50 in the outer flange 70 of the second section 19 may be provided.

Successive steps of assembling an assembly according to seventh embodiment of the present invention are shown in FIGS. 17A-17B. This embodiment differs from the fifth embodiment (FIGS. 15A-15D), in that the first section 18 comprises a flange 65 instead of a body 25 between the support surface 26 and a recess 42, 66 of the respective section 18, 19. This is especially important for jacket constructions, where exact rotational positioning of multiple connected sections may not be guaranteed.

An assembly according to the invention may also be used to temporarily fasten a section, e.g. so-called 'sea fastening' for transporting said sections over sea on board of a (not shown) ship. FIGS. 18A and 18B show a fastening tool 55 that comprises a first section 18 that is fixed to a structural pad 56 of the ship. In FIG. 18B, the actuator 24 is connected to an alternative housing with a dual-action driver 57. The shown dual-action driver 57 comprises a piston 58, that is provided with a drive shaft 59 that is arranged in a threaded hole 53 of the actuator 24. Using piston 58, the actuator 24 may be temporarily activated, securely fastening the second section 19 with a clamping action.

Furthermore, an assembly according to the invention may also be used as a lifting tool 60, which is configured to temporarily engage with a first section 18. For this temporary engagement, the lifting tool 60 shown in FIGS. 19A and 19B is also provided with an alternative housing with a dual-action driver 57, similar to the fastening tool 55 described in the paragraph above. After engaging the lifting tool 60 with a section, the lifting tool 60 and section may be securely handled with a (not shown) crane.

Both the fastening tool 55 and the lifting tool 60 comprise a bushing 67 in bore 38, which may facilitate a relative low friction at the contact surface between actuator 24 and said bushing 67. Furthermore, the bushing 67 may be made of a relatively soft material, in order to influence the stiffness.

In order to allow a secure engagement between the lifting tool 60 and the respective to be lifted section 18, guide means are provided (FIG. 20). The guide means may comprise guide pins 61 arranged on the lifting tool 60, and configured to be guided against a wall of the section 18. In FIG. 20, the guide pins 61 are configured to be arranged against the outer wall of the first section 18, but the skilled person will understand that the inner wall may provide an alternative engagement surface. In order to align the alternative housings with the dual-action drivers 57 with corresponding recesses or through holes, rotational alignment may be obtained with a V-shaped centering member 62 and mating rotational alignment pin 63.

The alternative housings with the dual-action drivers 57 may also be effectively used to provide a very fast fixation. Once the actuators that are driven with the dual-action drivers 57 are brought into clamping engagement, there is sufficient time to comfortably activate the other actuators 24 once the desired alignment of the connected sections 18, 19 is obtained. This alignment may be secured by introducing a hydraulic fluid that solidifies once cured. During curing, the temporary actuators may secure the alignment. Once the actuators 24 are arranged in clamping engagement, and the optional hydraulic fluid is cured, the alternative housings may optionally be removed and replaced for actuators 24 with a housing 49.

As mentioned before in relation to FIG. 1, the connections C for which the assembly according to the invention may be used are multiple. For example, each of the first 18 and the second section 19 may be an upright section of a monopile tower. Also, one of the first 19 and the second section 19 may be a rotor blade of a wind turbine. The other of the first 18 and the second section 19 may be arranged on a hub, or—alternatively—be either a fastening tool 55 fixed to a structural part of a ship for sea fastening, or be a lifting tool 60. Such a fastening tool 55 for sea fastening may also be used for fixing e.g. an upright section 19 of a monopile tower to a ship. Likewise, such a lifting tool 60 may be used for coupling to a section of a monopile tower for successive lifting and handling thereof.

Although they show preferred embodiments of the invention, the above described embodiments are intended only to illustrate the invention and not to limit in any way the scope of the invention. FIG. 1 shows an offshore wind turbine tower construction, but the assembly according to the invention is not limited to offshore use, nor to wind turbine applications alone.

It is remarked that in the following description of the shown embodiments, the lower section is denoted as the first section 18, and that the upper section is denoted as the second section 19. The skilled person will understand that the lower section could be interpreted as a second section 19 and the upper section could be interpreted as a first section 18 within the scope of the invention.

It should be understood that where features mentioned in the appended claims are followed by reference signs, such signs are included solely for the purpose of enhancing the intelligibility of the claims and are in no way limiting on the scope of the claims. Furthermore, it is particularly noted that the skilled person can combine technical measures of the different embodiments. For example, chamfered guide surface 37, 38 as shown for the third embodiment may also be applied for the other embodiments. Also, bushings 67 as shown in FIGS. 18 and 19, may also be applied in all other embodiments.

The scope of the invention is defined solely by the following claims.

The invention claimed is:

1. An assembly, comprising:
 a first section and a second section, each comprising a longitudinal axis; and
 a fixation configured to fix the first section and the second section;
 wherein at least one of the first section and the second section comprises a body that is configured to be engaged by the fixation;
 wherein the fixation comprises:
  an abutment; and
  a radially displaceable actuator;
 wherein the abutment and the radially displaceable actuator are part of the other of the first section and the second section than the body and together define a clamp configured for clamping the body in between;

wherein the actuator is radially displaceable with respect to the longitudinal axis of the section that comprises the actuator;

wherein at least one of the first section and the second section is an upright section of an offshore wind turbine construction, wherein the second section comprises near its end an inner flange and an outer flange which are spaced apart and configured to receive the first section there between; and wherein the radially displaceable actuator is arranged on one of the inner flange and the outer flange and is configured to extend from the one of the inner flange and the outer flange through the first section towards the other of the inner flange and the outer flange, wherein the radially displaceable actuator is suspended by both the inner flange and the outer flange when the fixation fixes the first section and the second section.

2. The assembly according to claim 1, wherein the longitudinal axes of the first section and the second section are parallel.

3. The assembly according to claim 1, wherein the abutment abuts against a support surface of the body.

4. The assembly according to claim 1, wherein the body is arranged between the support surface and a recess of the respective section.

5. The assembly according to claim 1, wherein a clamping action of the clamp is directed in the axial direction of the assembly.

6. The assembly according to claim 1, wherein the actuator has a contact surface that is configured to engage a mating engagement surface of the body.

7. The assembly according to claim 6, wherein the support surface and the engagement surface are arranged on opposite sides of the body.

8. The assembly according to claim 6, wherein the contact surface of the actuator and the engagement surface of the body comprise a corresponding chamfer.

9. The assembly according to claim 8, wherein the chamfer of the contact surface and/or the chamfer of the engagement surface has an angle of less than 25°.

10. The assembly according to claim 1, wherein the radially displaceable actuator is arranged in a radial bore of the other of the first section and the second section.

11. The assembly according to claim 1, wherein multiple radially displaceable actuators are arranged along the circumference of the other of the first and the second section.

12. The assembly according to claim 1, wherein multiple actuators are connected to and driveable by a common source.

13. The assembly according to claim 1, wherein one or more than one actuator is hydraulically displaced, and at least one of:
a hydraulic fluid used for displacing the actuator remains in a pressure chamber, wherein the pressure chamber comprises a one-way inlet valve configured to introduce hydraulic fluid into the pressure chamber, and
the hydraulic fluid is configured to cure and thereby transform into a substantially solid state.

14. The assembly according to claim 1, wherein at least one of the first and the second section comprises at least one additional body that is configured to be engaged by an additional fixation; and wherein the additional fixation comprises the abutment and at least one additional radially displaceable actuator.

15. The assembly according to claim 14, wherein the body and the additional body are arranged at an axial distance, wherein the fixation and the additional fixation each comprise multiple radially displaceable actuators, and wherein the actuators of the fixation are arranged in a staggered arrangement with respect to the actuators of the additional fixation.

16. The assembly according to claim 1, wherein the at least one of the first section and the second section that comprises the body further comprises a hammering surface, wherein the hammering surface is arranged on a wall extending from the section past the support surface, and wherein a seal is arranged between the wall extending from the section past the support surface and the other of the first section and the second section.

17. The assembly according to claim 1, wherein one or both of the first section and the second section comprise at least one chamfered guide surface.

18. The assembly according to claim 1, wherein the actuator is elastically pretensioned in a radial direction.

19. The assembly according to claim 1, comprising a symmetrical arrangement having radially displaceable actuators that are arranged on opposite sides of the first section.

* * * * *